(12) United States Patent
Guo et al.

(10) Patent No.: US 11,762,489 B2
(45) Date of Patent: Sep. 19, 2023

(54) ARRAY SUBSTRATE AND METHOD OF DRIVING THE SAME, TOUCH DISPLAY DEVICE

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Zhixuan Guo, Beijing (CN); Fengguo Wang, Beijing (CN); Yezhou Fang, Beijing (CN); Xinguo Wu, Beijing (CN); Hong Liu, Beijing (CN); Shiyu Zhang, Beijing (CN); Lei Li, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 556 days.

(21) Appl. No.: 17/042,663

(22) PCT Filed: Dec. 13, 2019

(86) PCT No.: PCT/CN2019/125366
§ 371 (c)(1),
(2) Date: Sep. 28, 2020

(87) PCT Pub. No.: WO2021/114282
PCT Pub. Date: Jun. 17, 2021

(65) Prior Publication Data
US 2023/0118501 A1    Apr. 20, 2023

(51) Int. Cl.
*G06F 3/041* (2006.01)
*G06F 3/044* (2006.01)

(52) U.S. Cl.
CPC ........ *G06F 3/0412* (2013.01); *G06F 3/04164* (2019.05); *G06F 3/04166* (2019.05);
(Continued)

(58) Field of Classification Search
None
See application file for complete search history.

(56) References Cited

U.S. PATENT DOCUMENTS

2016/0026290 A1*  1/2016  Liu .................... G06F 3/047
                                                          345/174
2017/0160845 A1*  6/2017  Lee .................... G06F 3/047
(Continued)

*Primary Examiner* — Krishna P Neupane
(74) *Attorney, Agent, or Firm* — Procopio, Cory, Hargreaves & Savitch LLP

(57) ABSTRACT

An array substrate includes a base substrate; a common electrode layer including a plurality of common electrodes, arranged in an array, a part of which being also used as first touch electrodes and another part of which being also used as second touch electrodes; a first conductive layer including a plurality of electrode connecting lines, each row of first touch electrodes being coupled serially by at least one electrode connecting line; and a second conductive layer including a plurality of first touch signal lines and a plurality of second touch signal lines, each row of first touch electrodes being coupled to at least one first touch signal line which is configured to transmit a first touch signal; each second touch electrode or each column of second touch electrodes being coupled to at least one second touch signal line which is configured to transmit a second touch signal.

20 Claims, 11 Drawing Sheets

(52) U.S. Cl.
CPC .......... *G06F 3/0445* (2019.05); *G06F 3/0446* (2019.05); *G06F 2203/04104* (2013.01); *G06F 2203/04107* (2013.01)

(56) References Cited

U.S. PATENT DOCUMENTS

| | | | |
|---|---|---|---|
| 2017/0185210 A1* | 6/2017 | Zhou | G06F 3/0445 |
| 2017/0228074 A1* | 8/2017 | Du | G06F 3/0412 |
| 2018/0188614 A1* | 7/2018 | Yeh | G02F 1/1368 |
| 2018/0292934 A1* | 10/2018 | Xu | G06F 3/0443 |

\* cited by examiner

ARRAY SUBSTRATE AND METHOD OF DRIVING THE SAME, TOUCH DISPLAY DEVICE

CROSS-REFERENCE TO RELATED APPLICATION

This application is a national phase entry under 35 USC 371 of International Patent Application No. PCT/CN2019/125366 filed on 13 Dec. 2019, which is incorporated herein by reference in its entirety.

TECHNICAL FIELD

This disclosure relates to the field of display technologies, and in particular, to an array substrate and a method of driving the same, and a touch display device.

BACKGROUND

With the rapid development of display technologies, touch display devices have become popular in people's daily lives. The in-cell touch display device is a device in which touch electrodes are embedded in the touch display device, and has advantages of small overall thickness and low manufacturing cost.

SUMMARY

In one aspect, an array substrate is provided. The array substrate includes a base substrate, a common electrode layer disposed on a side of the base substrate, a first conductive layer disposed on a side of the common electrode layer proximate to or away from the base substrate, and a second conductive layer disposed on a side of the common electrode layer proximate to or away from the base substrate. The common electrode layer includes a plurality of common electrodes arranged in an array, a part of common electrodes of the plurality of common electrodes are also used as first touch electrodes, and another part of common electrodes of the plurality of common electrodes are also used as second touch electrodes. The first conductive layer includes a plurality of electrode connecting lines, and each row of first touch electrodes arranged in a first direction is connected in series by at least one of the plurality of electrode connecting lines. The second conductive layer includes a plurality of first touch signal lines and a plurality of second touch signal lines; each row of first touch electrodes arranged in the first direction is coupled to at least one of the plurality of first touch signal lines, and each first touch signal line is configured to transmit a first touch signal; each second touch electrode or each column of second touch electrodes arranged in a second direction is coupled to at least one of the plurality of second touch signal lines, and each second touch signal line is configured to transmit a second touch signal. The first direction intersects the second direction.

In some embodiments, the first conductive layer is a gate electrode layer, and is located between the base substrate and the common electrode layer. The second conductive layer is a source-drain electrode layer, and is located between the gate electrode layer and the common electrode layer.

In some embodiments, the array substrate further includes: a first insulating layer disposed between the first conductive layer and the second conductive layer, and a second insulating layer disposed between the second conductive layer and the common electrode layer. A plurality of first vias extending through the first insulating layer are defined in the first insulating layer. A plurality of second vias extending through the second insulating layer are defined in the second insulating layer. Each row of first touch electrodes is coupled to the at least one of the electrode connecting lines sequentially through some of the plurality of second vias and some of the plurality of first vias.

In some embodiments, the plurality of first vias are in one-to-one correspondence with the plurality of second vias, and an orthographic projection of each of the plurality of first vias on the base substrate at least partially overlaps with an orthographic projection of a corresponding second via on the base substrate, so that the first via and the corresponding second via form a trepanning structure.

In some embodiments, each row of first touch electrodes corresponds to at least one row of trepanning structures, with respective ones of each row of sleeve hole structures being arranged in the first direction, and corresponding to respective ones of each row of first touch electrodes, respectively. Each of the at least one electrode connecting line that serially connects each row of first touch electrodes extends in the first direction, and is coupled to the first touch electrodes in the row of first touch electrodes through a row of trepanning structures corresponding to the row of first touch electrodes.

In some embodiments, each row of first touch electrodes is coupled to the at least one first touch signal line through at least one of the plurality of second vias.

In some embodiments, each first touch electrode in each row of first touch electrodes corresponds to at least one column of second vias, with respective ones of each column of second vias being arranged in the second direction. Each of the at least one first touch signal line coupled to each row of first touch electrodes extends in the second direction, and is coupled to the row of first touch electrodes through a column of second vias corresponding to a first touch electrode in the row of first touch electrodes.

In some embodiments, each of the at least one first touch signal line coupled to each row of first touch electrodes is coupled to the row of first touch electrodes through a column of second vias corresponding to a first touch electrode in the row of first touch electrodes. A position of the column of second vias corresponding to the first touch electrode is an access point of a first touch signal of the row of first touch electrodes, and orthographic projections of the access points of first touch signals of all rows of first touch electrodes on the base substrate are arranged in an inverted V shape.

In some embodiments, each first touch electrode in each row of first touch electrodes corresponds to at least one column of first vias, with respective ones of each column of first via holes being arranged in the second direction. The second conductive layer further includes a plurality of dummy touch signal lines extending in the second direction. For each row of first touch electrodes, except the ones coupled to the at least one first touch signal line, each of the rest corresponds to at least one dummy touch signal line. Each of the at least one dummy touch signal line electrically connects electrode connecting lines passing through the column of first vias through the column of first vias corresponding to the first touch electrode corresponding to the dummy touch signal line.

In some embodiments, the at least one dummy touch signal line of the plurality of dummy touch signal lines has a plurality of breaks. An orthographic projection of at least one of the plurality of breaks on the base substrate is located between orthographic projections of two first touch electrodes adjacent in the second direction on the base substrate; and/or the orthographic projection of the at least one of the plurality of breaks on the base substrate is located between orthographic projections of one first touch electrode and one second touch electrode that are adjacent in the second direction on the base substrate.

In some embodiments, the array substrate further includes the second insulating layer disposed between the second conductive layer and the common electrode layer, and a plurality of third vias extending through the second insulating layer are defined in the second insulating layer. Each second touch electrode or each column of second touch electrodes is coupled to the at least one second touch signal line through at least one of the plurality of third vias.

In some embodiments, each second touch electrode corresponds to at least one column of third vias, with respective ones of each column of third vias being arranged in the second direction. Each of the at least one second touch signal line coupled to each second touch electrode extends in the second direction, and is coupled to the second touch electrode through a column of third vias corresponding to the second touch electrode.

In some embodiments, the array substrate has a touch area and a peripheral area located at at least one side of the touch area. Second touch signal lines coupled to each column of second touch electrodes are coupled to each other in the peripheral area.

In some embodiments, each column of second touch electrodes corresponds to at least one column of third vias, with respective ones of each column of third vias being arranged in the second direction, and corresponding to respective ones of each column of second touch electrodes, respectively. Each of the at least one second touch signal line coupled to each column of second touch electrodes extends in the second direction, and is coupled to the column of second touch electrodes through a column of third vias corresponding to the column of second touch electrodes.

In some embodiments, the common electrode layer includes a plurality of first touch units and a plurality of second touch units. Each of the plurality of first touch units includes at least one first touch electrode, and each of the plurality of second touch units includes at least one second touch electrodes.

In some embodiments, the first touch unit and the second touch unit are alternately arranged in the first direction; and/or, the first touch unit and the second touch unit are alternately arranged in the second direction.

In some embodiments, the first touch unit includes 2 to 8 first touch electrodes, and the second touch unit includes 2 to 8 second touch electrodes.

In some embodiments, the touch area of the array substrate is divided into a plurality of sub-areas, with two first touch units and two second touch units being arranged in each of the plurality of sub-areas. Each first touch unit includes four first touch electrodes, and each second touch unit includes four second touch electrodes.

In another aspect, a touch display device is provided. The display device includes the array substrate as described in any of the above embodiments, and a touch chip. The touch chip is coupled to the plurality of first touch signal lines and the plurality of second touch signal lines of the array substrate; the touch chip is configured to supply a first touch signal required for a touch position detection to each of the plurality of first touch signal lines, and to supply a second touch signal required for touch position detection to each of the plurality of second touch signal lines.

In yet another aspect, a method of driving an array substrate is provided, which is applied to the array substrate as described in any of the above embodiments. The method includes a plurality of driving cycles, each of which includes a display phase and a touch phase. In the display phase, a common voltage signal is transmitted to each common electrode of the array substrate. In the touch phase, a first touch signal is sequentially transmitted to each row of first touch electrodes of the array substrate row by row, and a second touch signal is obtained from each second touch electrode or each column of second touch electrodes of the array substrate. Or in the touch phase, the second touch signal is sequentially transmitted to each second touch electrode of the array substrate one by one, or the second touch signal is sequentially transmitted to each column of second touch electrodes of the array substrate column by column, and the first touch signal is obtained from each row of first touch electrodes of the array substrate.

BRIEF DESCRIPTION OF THE DRAWINGS

In order to describe technical solutions in this disclosure more clearly, accompanying drawings to be used in some embodiments of this disclosure will be introduced briefly. Obviously, the accompanying drawings to be described below are merely accompanying drawings of some embodiments of this disclosure, and a person of ordinary skill in the art can obtain other drawings according to these drawings. In addition, the accompanying drawings to be described below may be regarded as schematic diagrams, and are not limitations on actual sizes of products, an actual process of a method and actual timings of signals that the embodiments of this disclosure relate to.

DETAILED DESCRIPTION

Figure 1:
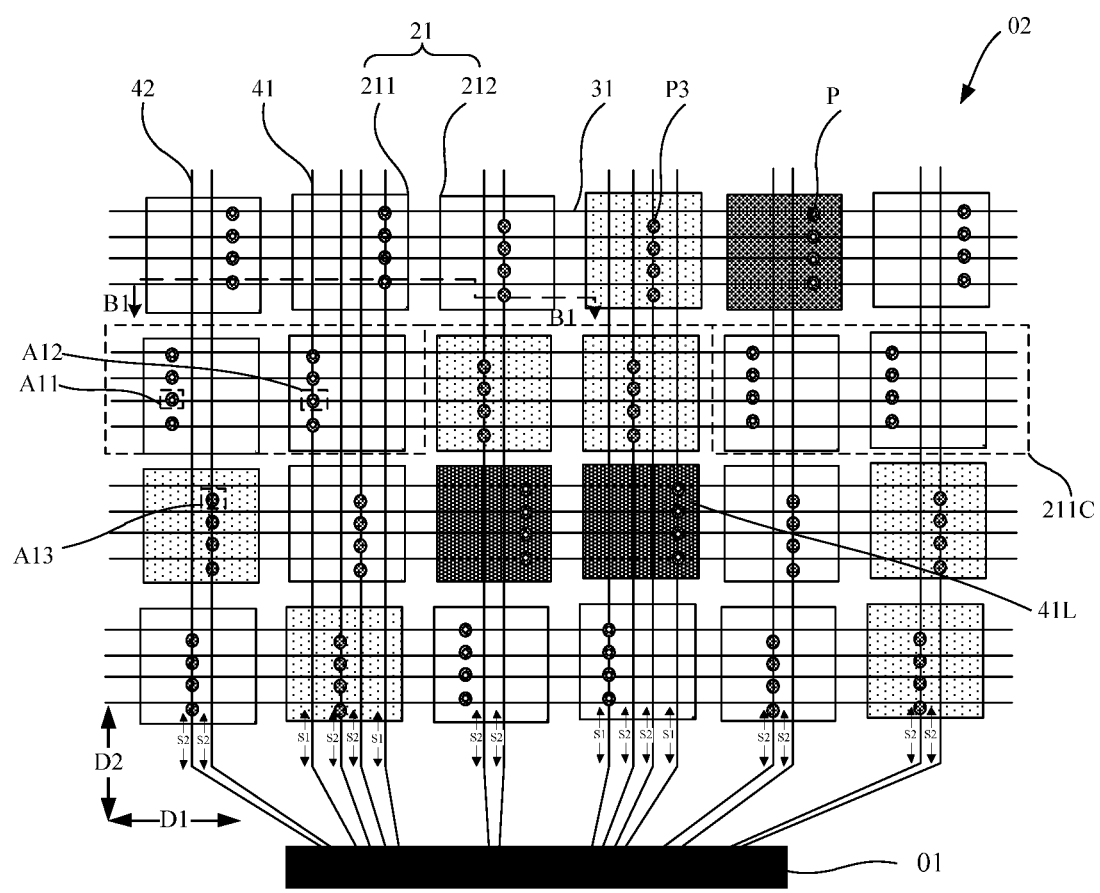
FIG. 1 is a top view of an array substrate, in accordance with some embodiments of this disclosure.

Technical solutions in some embodiments of this disclosure will be described clearly and completely in combination with accompanying drawings. Obviously, the described embodiments are merely some but not all embodiments of this disclosure. All other embodiments obtained on a basis of the embodiments of this disclosure by a person of ordinary skill in the art shall be included in the protection scope of this disclosure.

Unless the context requires otherwise, throughout the description and the claims, the term "comprise" and other forms thereof such as the third-person singular form "comprises" and the present participle form "comprising" are interpreted as open and inclusive, i.e., "including, but not limited to". In the description of the description, terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of this disclosure. Schematic representations of the above terms do not necessarily refer to same embodiment(s) or example(s). In addition, the specific features, structures, materials or characteristics may be included in any or more embodiments or examples in any suitable manner.

Terms such as "first" and "second" are only used for descriptive purposes and are not to be construed as indicating or implying a relative importance or implicitly indicating the number of indicated technical features below. Thus, features defined by the terms "first" and "second" may explicitly or implicitly include one or more of the features. In the description of the embodiments of this disclosure, the term "a/the plurality of" means two or more unless otherwise specified.

In describing some embodiments, expressions "coupled", "connected" and derivatives thereof may be used. For example, terms "connected" and "connected in series" may be used in the description of some embodiments to indicate that two or more components are in direct physical or electrical contact with each other. As another example, the term "coupled" may be used in the description of some embodiments to indicate that two or more components are in direct physical or electrical contact. The term "coupled" or "communicatively coupled", however, may also mean that two or more components are not in direct contact with each other, but yet still cooperate or interact with each other. The embodiments disclosed herein are not necessarily limited to the content herein.

The expression "at least one of A, B and C" has the same meaning as the expression "at least one of A, B or C", and both include the following combinations of A, B and C: only A, only B, only C, a combination of A and B, a combination of A and C, a combination of B and C, and a combination of A, B and C.

The expression "A and/or B" includes the following three combinations: only A, only B, and a combination of A and B.

Orientations or positional relationships indicated by terms "up/above", "down/below", "row/row direction", "column/column direction" and the like are based on the orientations or positional relationships shown in the accompanying drawings, and are merely for convenience of explanation of the technical solution of this disclosure, and are not intended to indicate or imply that a referred device or component must have a particular orientation, and must be constructed and operated in a particular orientation. Therefore, they cannot be construed as limitations to this disclosure.

For example, in some cases, embodiments involving "row direction" may be implemented in a case of "column direction", and vice versa. It is also within the scope of the claims to be protected by this disclosure to rotate or mirror the solution of this disclosure by 90°.

As shown in FIGS. 1, 2a, 2b and 3, some embodiments of this disclosure provide an array substrate 02. In the array substrate 02, touch electrodes for realizing a touch function are integrated in the array substrate 02 with an in-cell touch structure, so that a detection of a touch position is realized.

Figure 3:
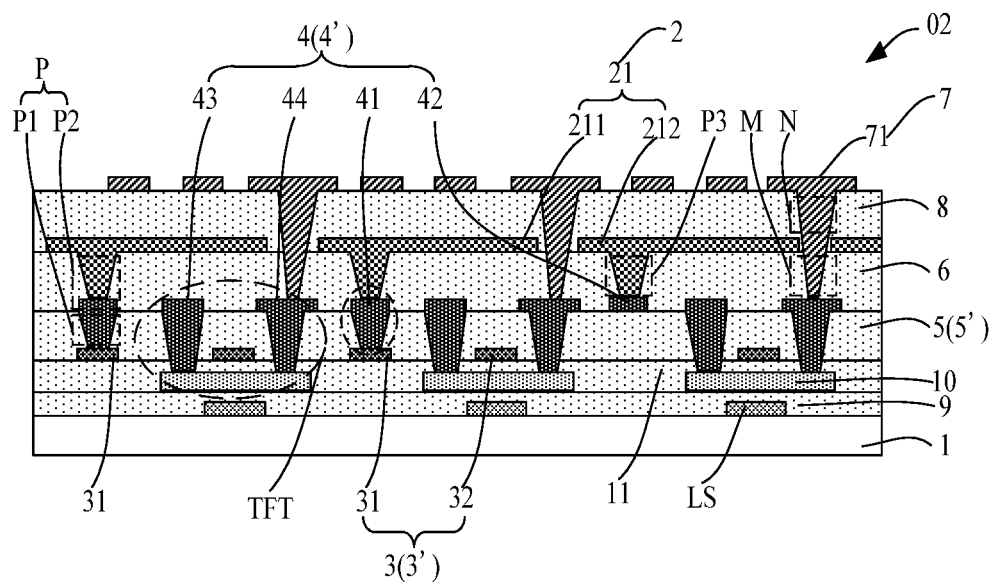
FIG. 3 is a schematic cross-sectional view of the array substrate shown in FIG. 1 along the section line B1-B1.

Referring to FIG. 3, the array substrate 02 includes: a base substrate 1, a common electrode layer 2 disposed on a side of the base substrate 1, a first conductive layer 3 and a second conductive layer 4.

The first conductive layer 3 is disposed on a side of the common electrode layer 2 proximate to or away from the base substrate 1. For example, as shown in FIG. 3, the first conductive layer 3 is proximate to the base substrate 1 relative to the common electrode layer 2. As another example, in some other embodiments, the first conductive layer 3 is away from the base substrate 1 relative to the common electrode layer 2.

The second conductive layer 4 is disposed on a side of the common electrode layer 2 proximate to or away from the base substrate 1. For example, as shown in FIG. 3, the second conductive layer 4 is proximate to the base substrate 1 relative to the common electrode layer 2. As another example, in some other embodiments, the second conductive layer 4 is away from the base substrate 1 relative to the common electrode layer 2.

Figure 2A:
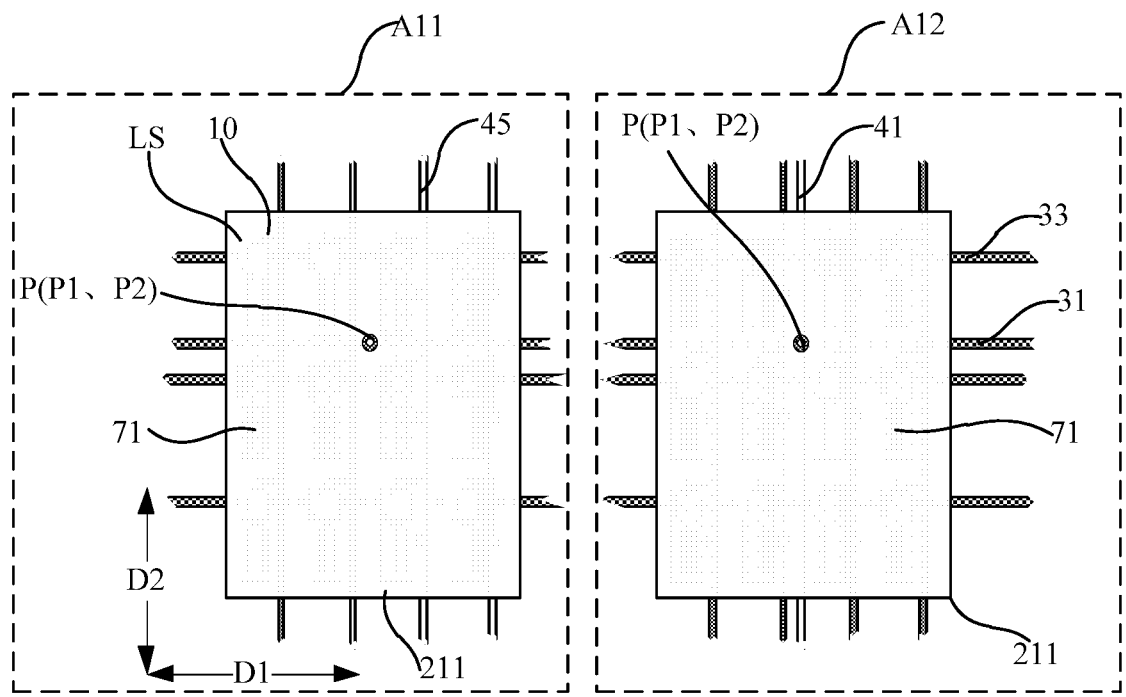
FIG. 2a is a layout view of the A11 part and the A12 part of the array substrate shown in FIG. 1.
Figure 2B:
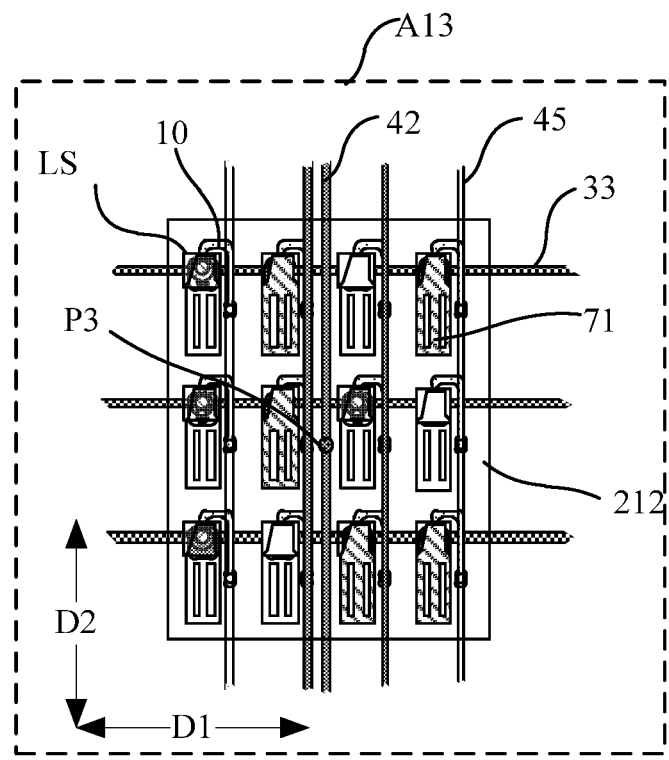
FIG. 2b is a layout view of the A13 part of the array substrate shown in FIG. 1.

Referring to FIGS. 1, 2a and 2b, the common electrode layer 2 includes a plurality of common electrodes 21 arranged in an array.

Herein, the array arrangement may be made in a plurality of rows and columns, for example, 4 rows and 6 columns as exemplarily illustrated in FIG. 1. A row direction and a column direction in which the plurality of common electrodes 21 are arranged are set as a first direction D1 and a second direction D2, respectively. It will be understood that the row direction and the column direction in which the plurality of common electrodes are arranged intersect with each other. That is, the first direction D1 and the second direction D2 intersect with each other, for example, the first direction D1 and the second direction D2 are perpendicular to each other.

In the embodiments of this disclosure, in a display phase of driving the array substrate 02, the common electrode layer 2 cooperates with a pixel electrode layer 7 of the array substrate 02 to form an electric field to drive sub-pixels PX of a display panel for displaying. Referring to FIG. 1, in a touch phase of driving the array substrate 02, a part of common electrodes 21 of the plurality of common electrodes 21 of the common electrode layer 2 are also used as first touch electrodes 211, and another part of common electrodes 21 of the plurality of common electrodes 21 are also used as second touch electrodes 212 to realize a detection of a touch position. That is, the common electrode layer 2 not only has a function of driving display, but also has a function of detecting the touch position, which realizes a multiuse of the common electrode layer 2. Therefore, compared with the technical solution in the related art in which not only the common electrode layer for realizing a display function is provided, but also the touch electrode layer for realizing the touch position detection function is provided, the array substrate 02 provided by the embodiments of this disclosure may help to reduce an overall thickness of the array substrate 02 and simplify an internal structure of the array substrate 02.

Referring to FIGS. 1, 2a, 2b and 3, the first conductive layer 3 includes a plurality of electrode connecting lines 31. Each row of first touch electrodes 211 arranged in the first direction D1 is connected in series by at least one of the plurality of electrode connecting lines 31, which is equivalent to forming first touch electrode strips 211C in multiple rows extending in the first direction D1.

Figure 4:
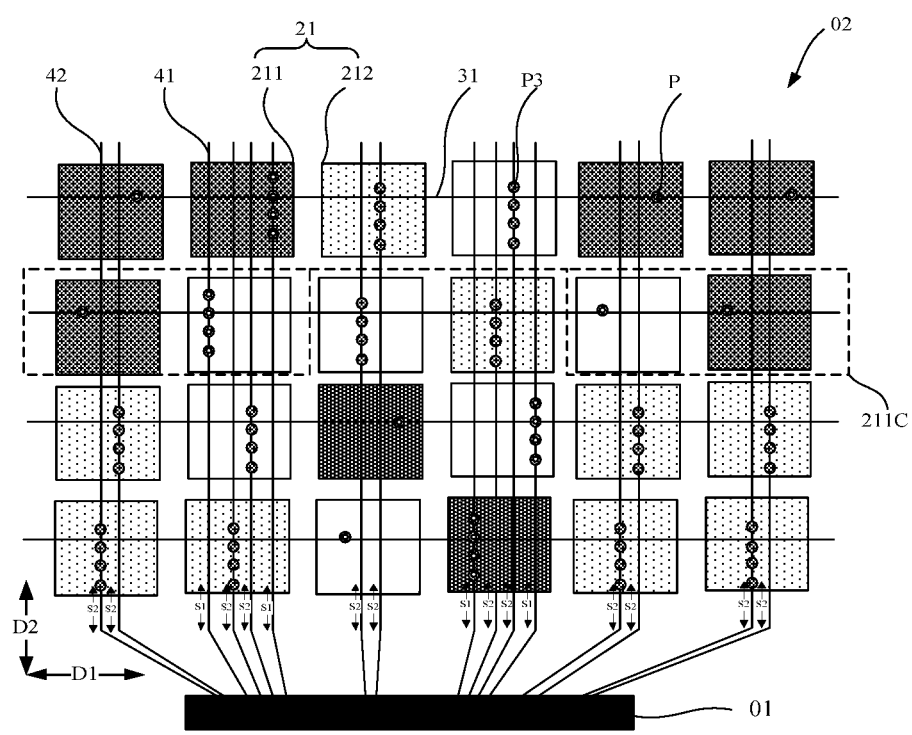
FIG. 4 is a top view of another array substrate, in accordance with some embodiments of this disclosure.

For example, as shown in FIG. 4, each row of first touch electrodes 211 is connected in series by one electrode connecting line 31. In this way, with each row of first touch electrodes 211 being connected in series to form a first touch electrode strip 211C in a row, the wiring is relatively simple.

For example, as shown in FIG. 1, each row of first touch electrodes 211 is connected in series by a plurality of electrode connecting lines 31. In this way, a first touch signal S1 is transmitted between the first touch electrodes 211 in first touch electrode strip 211C in each row through the plurality of electrode connecting lines 31, so that transmission speed and uniformity of signals on the first touch electrode strip 211C may be improved, thus improving a positioning accuracy for the touch position when the array substrate 02 realizes the touch position detection function.

In the embodiments of this disclosure, as shown in FIG. 1, a plurality of electrode connecting lines 31 serially connecting a row of first touch electrodes 211 may all extend in the first direction D1 and be arranged in parallel in the second direction D2.

In FIG. 1, the number of the plurality of electrode connecting lines 31 serially connecting a row of first touch electrodes 211 is exemplarily illustrated as four. In some other embodiments of this disclosure, the number of the plurality of electrode connecting lines 31 serially connecting a row of first touch electrodes 211 may be three, five, six, seven, eight, etc.

With continued reference to FIGS. 1, 2a, 2b and 3, the second conductive layer 4 includes a plurality of first touch signal lines 41 and a plurality of second touch signal lines 42. Each of the first touch signal lines 41 is configured to transmit a first touch signal S1; and each of the second touch signal lines 42 is configured to transmit a second touch signal S2.

It will be noted that, in the embodiments of this disclosure, each first touch signal lines 41 and each second touch signal line 42 is electrically connected to a touch chip 01 respectively. In the figures of the embodiments of this disclosure, a conductive line marked with the first touch signal S1 on the left is the first touch signal line 41; and a conductive line marked with the second touch signal S2 on the left is the second touch signal line 42. And, each of the dummy touch signal lines 46 appearing hereinafter is not connected to the touch chip 01. In addition, in each figure, among the conductive lines extending in the second direction D2, the ones without the first touch signal S1 and the second touch signal S2 are dummy touch signal lines 46, which will not be repeated in the following.

With continued reference to FIGS. 1, 2a, 2b and 3, each row of first touch electrodes 211 (i.e., the first touch electrode strip 211C in each row) arranged in the first direction D1 is coupled to at least one of a plurality of first touch signal lines 41. In this way, each row of first touch electrodes 211 may obtain the first touch signal S1 from the touch chip 01 or transmit the first touch signal S1 to the touch chip 01 through the first touch signal line(s) 41 coupled thereto.

For example, as shown in FIG. 1, among the first touch electrodes 211 in a first row (i.e., the first touch electrode strip 211C in the first row), the first touch electrode 211 in a second column is coupled to one first touch signal line 41.

In addition, since the first touch electrodes 211 in the first row are connected in series by four electrode connecting lines 31, the first touch electrodes 211 in the first row are coupled to the first touch signal line 41.

Herein, in FIG. 1, the number of first touch signal lines 41 coupled to each row of first touch electrodes 211 is exemplarily illustrated as one. In some other embodiments of this disclosure, the number of first touch signal lines 41 coupled to each row of first touch electrodes 211 may be two, three, four, five, etc.

It will be noted herein that, in the embodiments provided by this disclosure, the n-th row refers to the n-th row from top to bottom in the second direction D2; and the m-th column refers to the m-th column from left to right in the first direction D1. In addition, as mentioned below, the x-th electrode connecting line 31 refers to the x-th electrode connecting line 31 from top to bottom in the second direction D2; and the y-th first touch signal line 41, the y-th second touch signal line 42 and the y-th dummy touch signal line 46 refer to the y-th first touch signal line 41, the y-th second touch signal line 42 and the y-th dummy touch signal line 46 from left to right in the first direction D1, respectively.

With continued reference to FIGS. 1, 2a, 2b and 3, each second touch electrode 212 or each column of second touch electrodes 212 arranged in the second direction D2 is coupled to at least one second touch signal line 42 of the plurality of second touch signal lines 42. In this way, each second touch electrode 212 or each column of second touch electrodes 212 arranged in the second direction D2 may obtain the second touch signal S2 from the touch chip 01 or transmit the second touch signal S2 to the touch chip 01, through the second touch signal line(s) 42 coupled thereto.

For example, as shown in FIG. 1, each second touch electrode 212 is coupled to one second touch signal line 42.

Figure 10:
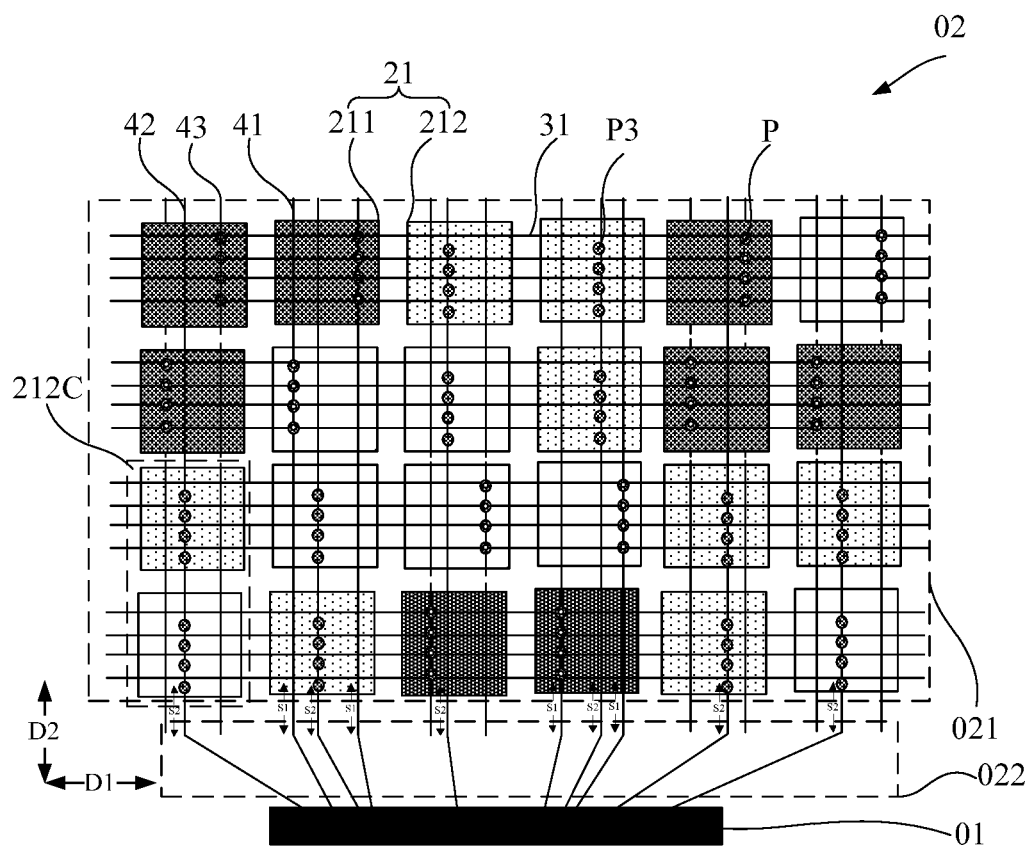
FIG. 10 is a top view of yet another array substrate, in accordance with some embodiments of this disclosure.

For example, as shown in FIG. 10, each column of second touch electrodes 212 arranged in the second direction D2 is coupled to one second touch signal line 42, which is equivalent to forming second touch electrode strips 212C in multiple columns extending in the second direction D2.

Herein, in FIG. 1, the number of second touch signal lines 42 coupled to each second touch electrode 212 is exemplarily illustrated as one. In FIG. 10, the number of second touch signal lines 42 coupled to each column of second touch electrodes 212 arranged in the second direction D2 is exemplarily illustrated to be one. In some other embodiments of this disclosure, the number of second touch signal lines 42 coupled to each second touch electrode 212 or each column of second touch electrodes 212 arranged in the second direction D2 may be multiple, such as two, three, four, five, etc.

In addition, in FIG. 1, in order to clearly show the first touch signal line 41, the second touch signal line 42, the electrode connection line 31, and their connection relationships with the common electrode 21, the first touch signal line 41, the second touch signal line 42 and the electrode connecting line 31 are drawn above the common electrode 21, which is not intended to represent their actual film position.

Moreover, FIGS. 1 to 3 only illustrate a portion of the array substrate 02, and the actual number of common electrodes 21 included in the array substrate 02 is much larger than the number illustrated in FIGS. 1 to 3. The number of common electrodes 21 illustrated in FIGS. 1 to 3 is only an example.

Based on this, the array substrate 02 provided by the above embodiments of this disclosure includes two types of touch electrodes, first touch electrode strips 211C in multiple rows and a plurality of second touch electrodes 212 or second touch electrode strips 212C in multiple columns. The two types of touch electrodes form a mutual capacitive touch structure, that is, in the touch phase, the first touch electrode strips 211C in multiple rows are configured as one of the types of driving electrodes and sensing electrodes, and the plurality of second touch electrodes 212 or the second touch electrode strips 212C in multiple columns are configured as the other of the types of the driving electrodes and the sensing electrodes. A capacitor is formed between the driving electrode and the sensing electrode, that is, the driving electrode and the sensing electrode constitute two ends of the capacitor.

When a finger of a person touches a touch area, coupling between the driving electrode and the sensing electrode near a touch point is influenced, thereby changing capacitance between the driving electrode and the sensing electrode near the touch point. When a touch detection is performed, magnitude of the capacitance is detected, and with the driving electrodes sending out driving signals and the sensing electrodes receiving the sensing signals, capacitance values between all the driving electrodes and all the sensing electrodes may be obtained, thus from this, capacitance variation data of the entire touch screen can be obtained, and coordinates of each touch point may be calculated. In this way, even if a plurality of touch points exist in the touch area, real coordinates of each touch point may be calculated, that is, a multi-touch may be realized.

Moreover, since the display function and the touch function of the array substrate 02 provided by the embodiments of this disclosure are performed in different time periods, interference between the two functions is less and touch sensitivity is higher.

In some embodiments, the first touch electrode strip 211C is configured as a driving electrode to be loaded with a driving signal TX when touch position detection is performed. The second touch electrode 212 or the second touch electrode strip 212C is configured as a sensing electrode for generating a sensing signal RX under the driving signal TX.

For example, the first touch electrode strip 211C is configured as a driving electrode; correspondingly, the first touch signal line 41 is configured as a driving signal line. In the touch phase, the first touch signal line 41 transmits the driving signal TX required for the touch position detection to the first touch electrode strip 211C coupled to the first touch signal line 41. The second touch electrodes 212 or the second touch electrode strip 212C is configured as a sensing electrode; correspondingly, the second touch signal line 42 is configured as a sensing signal line. In the touch phase, the second touch signal line 42 obtains the sensing signal RX obtained by performing the touch position detection from the second touch electrode 212 or the second touch electrode strip 212C coupled to the second touch signal line 42, and transmits the sensing signal RX.

In some embodiments, the second touch electrode 212 or the second touch electrode strip 212C is configured as a driving electrode to be loaded with the driving signal TX when touch position detection is performed. The first touch electrode strip 211C is configured as a sensing electrode for generating the sensing signal RX under the the driving signal TX.

For example, the second touch electrode 212 or the second touch electrode strip 212C is configured as a driving electrode; correspondingly, the second touch signal line 42 is configured as a driving signal line. In the touch phase, the second touch signal line 42 transmits the driving signal TX required for the touch position detection to the second touch electrode 212 or the second touch electrode strip 212C coupled to the second touch signal line 42. The first touch electrode strip 211C is configured as a sensing electrode; correspondingly, the first touch signal line 41 is configured as a sensing signal line. In the touch phase, the first touch signal line 41 obtains the sensing signal RX obtained by performing the touch position detection from the first touch electrode strip 211C coupled to the first touch signal line 41, and transmits the sensing signal RX.

It will be noted that, as shown in FIGS. 2a, 2b and 3, each sub-pixel of the array substrate 02 includes a thin film transistor TFT and a pixel electrode 71 that are disposed on the base substrate 1. The common electrode layer 2 may be disposed between the thin film transistor TFT and the pixel electrode layer 7 where pixel electrodes 71 are located, or on a side of the pixel electrode layer 7 away from the base substrate 1.

It will be noted that, in the embodiments provided by this disclosure, the common electrode 21 located in the common electrode layer 2 is a separate block electrode, and one common electrode 21 may correspond to one pixel electrode 71, as shown in FIGS. 2a and 2b, or may correspond to a plurality of adjacent pixel electrodes 71 (or "cover a plurality of adjacent pixel electrodes 71").

The thin film transistor TFT includes a gate 32, an active layer 10, a source 43 and a drain 44; the source 43 and the drain 44 are in contact with the active layer 10, and the drain 44 is electrically connected to the pixel electrode 71. The gate 32 is located in the gate electrode layer 3', and the source 43 and the drain 44 are located in a source-drain electrode layer 4'.

In some embodiments, as shown in FIG. 3, the first conductive layer 3 is a gate electrode layer 3', and the first conductive layer 3 is located between the base substrate 1 and the common electrode layer 2. That is, the plurality of electrode connecting lines 31 in the first conductive layer 3 are located in the gate electrode layer 3'. It will be understood that the gate electrode layer 3' further includes a plurality of gates 32 and a plurality of gate lines (the gate lines are not shown in FIG. 3). Therefore, the electrode connecting line 31, the gate 32 and the gate line 33 may be formed through a same patterning process, so that a step of forming the electrode connecting line 31 does not need to be additionally set, and thus simplifying the manufacturing process of the array substrate 02.

For example, as shown in FIGS. 2a and 2b, the electrode connecting line 31 and the gate line 33 are arranged parallel to each other. It will be understood that the electrode connecting line 31 is electrically insulated from the gate 32 and the gate line 33.

With continued reference to FIG. 3, in some embodiments, the second conductive layer 4 is a source-drain electrode layer 4', and is located between the gate electrode layer 3' and the common electrode layer 2. That is, the plurality of first touch signal lines 41 and the plurality of second touch signal lines 42 in the second conductive layer 4 are located in the source-drain electrode layer 4'. It will be understood that the source-drain electrode layer 4' further includes a plurality of sources 43, a plurality of drains 44 and a plurality of data lines (which are not shown in FIG. 3). Therefore, the first touch signal line 41, the second touch signal line 42, the source 43, the drain 44 and the data line may be formed through a same patterning process, so that a step of forming each first touch signal line 41 and a step of forming each second touch signal line 42 do not need to be additionally set, thus simplifying the manufacturing process of the array substrate 02.

For example, as shown in FIGS. 2a and 2b, the first touch signal line 41, the second touch signal line 42 and the data line 45 are arranged parallel to each other. It will be understood that the first touch signal line 41, the second touch signal line 42, the source 43, the drain 44 and the data line 45 are electrically insulated from each other.

Based on this, since the gate electrode layer 3' and the source-drain electrode layer 4' are film layers that are used to form thin film transistors TFT in the array substrate 02, as long as their patterns and electrical connection relationships are made to be in designs as described above, the plurality of electrode connecting lines 31 may be disposed in the gate electrode layer 3', and the plurality of first touch signal lines 41 and the plurality of second touch signal lines 42 may be disposed in the source-drain electrode layer 4', so that a mutual capacitive touch may be achieved without adding a new conductive layer. That is, a manufacturing of the plurality of electrode connecting lines 31 is compatible with a manufacturing of the gate electrode layer 3', and a manufacturing of the plurality of first touch signal lines 41 and the plurality of second touch signal lines 42 is compatible with a manufacturing of the source-drain electrode layer 4', so that a structure for touching may be integrated within the array substrate 02 and the mutual capacitive touch may be realized, without adding a patterning process.

In the array substrate 02, insulating layers (for example, as shown in FIG. 3, a gate insulating layer 11 disposed between the active layer 10 and the gate electrode layer 3', an interlayer dielectric layer 5' disposed between the gate electrode layer 3' and the source-drain electrode layer 4', a second insulating layer 6 disposed between the source-drain electrode layer 4' and the common electrode layer 2, and a third insulating layer 8 disposed between the pixel electrode layer 7 and the common electrode layer 2) for isolation are disposed between different conductive layers.

The thin film transistor TFT in the embodiments of this disclosure may be a bottom-gate thin film transistor or a top-gate thin film transistor.

In some embodiments, as shown in FIG. 3, in a case where the thin film transistor TFT is a top-gate thin film transistor, in a direction that is perpendicular to the base substrate 1 and away from the base substrate 1, the active layer 10, the gate insulating layer 11, the gate electrode layer 3', the interlayer dielectric layer 5', the source-drain electrode layer 4' and the second insulating layer 6 are sequentially provided on the base substrate 1. The common electrode layer 2, the pixel electrode layer 7 and the third insulating layer 8 therebetween are disposed on a side of the second insulating layer 6 away from the base substrate 1. The common electrode layer 2 may be closer to or farther away from the base substrate 1 than the pixel electrode layer 7. In the drawings of the embodiments of this disclosure, the common electrode layer 2 is exemplarily illustrated to be closer to the base substrate 1 than the pixel electrode layer 7.

It will be seen that, based on the above structure, an insulating layer, i.e., the interlayer dielectric layer 5', is disposed between the source-drain electrode layer 4' and the gate electrode layer 3'. That is, in a case where the first conductive layer 3 is the gate electrode layer 3' and the second conductive layer 4 is the source-drain electrode layer 4', as for the array substrate 02 with the top-gate thin film transistor, the interlayer dielectric layer 5' is disposed between the first conductive layer 3 and the second conductive layer 4.

In some embodiments, in a case where the thin film transistor TFT is a bottom-gate thin film transistor, a gate electrode layer, a gate insulating layer, an active layer, a source-drain electrode layer and a fourth insulating layer are sequentially disposed on the base substrate in a direction that is perpendicular to the base substrate and away from the base substrate 1. A common electrode layer, a pixel electrode layer and a fifth insulating layer therebetween are disposed on a side of the fourth insulating layer away from the base substrate. The common electrode layer may be closer to or farther away from the base substrate than the pixel electrode layer.

It will be seen that, based on the above structure, an insulating layer, i.e., a gate insulating layer 11, is disposed between the source-drain electrode layer 4' and the gate electrode layer 3'. That is, in a case where the first conductive layer 3 is the gate electrode layer 3' and the second conductive layer 4 is the source-drain electrode layer 4', as for the array substrate 02 having the bottom-gate thin film transistor, the gate insulating layer 11 is disposed between the first conductive layer 3 and the second conductive layer 4.

With the thin film transistor TFT of the array substrate 02 provided by the embodiments of this disclosure being exemplarily illustrated as a top-gate one, a manner in which each row of first touch electrodes 211 arranged in the first direction D1 is connected in series using the at least one electrode connecting line will be described in the following. It will be understood that the embodiments of this disclosure include, but are not limited to, implementations provided in the following embodiments.

In some embodiments, as shown in FIGS. 1 and 3, the array substrate 02 further includes: a first insulating layer 5 disposed between the first conductive layer 3 and the second conductive layer 4; and the second insulating layer 6 disposed between the second conductive layer 4 and the common electrode layer 2. As will be seen from the above description, in a case where the first conductive layer 3 is the gate electrode layer 3', the second conductive layer 4 is the source-drain electrode layer 4', and the thin film transistor TFT of the array substrate 02 is a top-gate thin film transistor, the first insulating layer 5 is the interlayer dielectric layer 5'.

With continued reference to FIGS. 1 and 3, a plurality of first vias PI extending through the first insulating layer 5 are defined in the first insulating layer 5, and a plurality of second vias P2 extending through the second insulating layer 6 are defined in the second insulating layer 6. As shown in FIGS. 1 and 3, each row of first touch electrodes 211 is sequentially coupled to at least one electrode connecting line 31 through some of the plurality of second vias P2 and some of the plurality of first vias PI (only four electrode connecting lines 31 are exemplarily illustrated in FIG. 1).

For example, as shown in FIG. 1, the respective ones of each row of first touch electrodes 211 is sequentially coupled to four electrode connecting lines 31 through four second vias P2 and four first vias P1.

In some embodiments, as shown in FIG. 3, the plurality of first vias P1 are in one-to-one correspondence with the plurality of second vias P2, that is, one first via P1 corresponds to one second via P2. An orthographic projection of each first via P1 of the plurality of first vias P1 on the base substrate 1 at least partially overlaps with an orthographic projection of a corresponding second via P2 on the base substrate 1, so that the first via P1 and the corresponding second via P2 form a trepanning structure P.

Based on this, as shown in FIG. 3, to realize an electrical connection between the first touch electrodes 211 in the common electrode layer 2 and the electrode connecting lines 31 in the gate electrode layer 3', a via needs to be made in the first insulating layer 5 and the second insulating layer 6 that are located between two film layers. However, if a via is directly manufactured to penetrate the two insulating layers, i.e., the first insulating layer 5 and the second insulating layer 6, the via may be etched poorly due to a large depth of the via. In the above embodiments, the first via P1 and the second via P2 corresponding to the first via P1 are separately manufactured to form a trepanning structure P penetrating the two insulating layers, which may reduce etching difficulty, and improve a contact between the first touch electrodes 211 and the electrode connecting lines 31.

In some embodiments, as shown in FIG. 1, each row of first touch electrodes 211 corresponds to at least one row of trepanning structures P. respective ones of each row of trepanning structures P are arranged in the first direction D1, and correspond to the respective ones of each row of first touch electrodes 211, respectively.

For example, as shown in FIG. 1, four first touch electrodes 211 in the first row correspond to four rows of trepanning structures P. Among the four rows of trepanning structures P, the first row includes four trepanning structures P which are in one-to-one correspondence with the four first touch electrodes 211 in the first row.

Similarly, each of the second, third and fourth rows of trepanning structures P also includes four trepanning structures P which are also in one-to-one correspondence with the four first touch electrodes 211 in the first row. That is, each of the four first touch electrodes 211 in the first row corresponds to each of the four trepanning structures P located in different rows.

Based on this, as shown in FIG. 1, each of the at least one electrode connecting line 31 serially connecting each row of first touch electrodes 211 is extended in the first direction D1, and coupled to respective ones of the row of first touch electrodes 211 through a row of trepanning structures P corresponding to the row of first touch electrodes 211.

For example, as shown in FIG. 1, the first electrode connecting line 31 is coupled to respective ones of the first touch electrodes 211 in the first row through the trepanning structures P in the first row.

Still, with the thin film transistor TFT of the array substrate 02 provided by the embodiments of this disclosure being exemplarily illustrated as a top-gate one, a manner in which each row of first touch electrodes 211 arranged in the first direction D1 is connected with the first touch signal line 41 will be described in the following. It will be understood that the embodiments of this disclosure include, but are not limited to, implementations provided in the following embodiments.

As shown in FIG. 3, a plurality of second vias P2 extending through the second insulating layer 6 are defined in the second insulating layer 6. Referring to FIG. 1, each row of first touch electrodes 211 is coupled to at least one first touch signal line 41 through at least one of the plurality of second vias P2.

For example, as shown in FIG. 1, in each row of first touch electrodes 211, one first touch electrode 211 is coupled to one first touch signal line 41 through four second vias P2, and the other first touch electrodes 211 are coupled to the one first touch electrode 211 through four electrode connecting lines 31. In this way, each row of first touch electrodes 211 is coupled to one first touch signal line 41.

The first touch electrodes 211 in the first row are taken as an example.

Among the first touch electrodes 211 in the first row, the first touch electrode 211 in the second column are coupled to one first touch signal line 41 through four second vias P2. Since the first touch electrodes 211 in the first row are connected in series by four electrode connecting lines 31, in the touch phase, a first touch signal S1 can be transmitted to the first touch electrode 211 in the first row and second column through one first touch signal line 41 coupled to the first touch electrode 211 in the first row and second column, and then transmitted to the rest of the first touch electrodes 211 in the first row by the four electrode connecting lines 31 serially connecting the first touch electrodes 211 in the first row, so that a coupling of the first touch electrodes 211 in the first row with one first touch signal line 41 can be achieved.

In some embodiments, as shown in FIG. 1, each first touch electrode 211 in each row of first touch electrodes 211 corresponds to at least one column of second vias P2, and the second vias P2 in each column of second vias P2 are arranged in the second direction D2.

For example, as shown in FIG. 1, the first touch electrode 211 in the first row and second column is taken as an example.

The first touch electrode 211 in the first row and second column corresponds to a column of second vias P2 which includes four second vias P2 are arranged in the second direction D2.

In FIG. 1, each first touch electrode 211 in each row of first touch electrodes 211 is exemplarily illustrated to correspond to one column of second vias P2. In some embodiments of this disclosure, the number of columns of the second vias P2 corresponding to each first touch electrode 211 in each row of first touch electrodes 211 may be more than one, e.g., 2 columns, 3 columns, 4 columns, 5 columns, etc.

Based on this, with continued reference to FIG. 1, each of the at least one first touch signal line 41 coupled to each row of first touch electrodes 211 is extended in the second direction D2 and is coupled to the row of first touch electrodes 211 through a column of second vias P2 corresponding to one first touch electrode 211 in the row of first touch electrodes 211.

For example, as shown in FIG. 1, a second first touch signal line 41 is taken as an example.

The second first touch signal line 41 is extended in the second direction D2, and is coupled to the first touch electrodes 211 in the first row through a column of second vias P2 corresponding to the first touch electrode 211 in the first row and second column.

With continued reference to FIG. 1, each of the at least one first touch signal line 41 coupled to each row of first touch electrodes 211 is coupled to the row of first touch electrodes 211 through a column of second vias P2 corresponding to one first touch electrode 211 in the row of first touch electrodes 211. A position where the column of second vias P2 corresponding to the one first touch electrode 211 is located is referred to as an access point 41L of a first touch signal of the row of first touch electrodes 211. That is, the access point 41L of the first touch signal is a position where each of the at least one first touch signal line 41 coupled to each row of first touch electrodes 211 transmits the first touch signal S1 to the row of first touch electrodes 211. It can also be said that the access point 41L of the first touch signal is a position where each row of first touch electrodes 211 is coupled to each first touch signal line 41.

For example, as shown in FIG. 1, the first touch electrodes 211 in the first row are taken as an example.

The first touch electrodes 211 in the first row are coupled with one first touch signal line 41. The one first touch signal line 41 is coupled to the first touch electrodes 211 in the first row through a column of second vias P2 corresponding to the first touch electrode 211 in the first row and second column. A position of the column of second vias P2 corresponding to the first touch electrode 211 in the first row and second column is the access point 41L of the first touch signal of the first touch electrodes 211 in the first row.

It will be understood that the number of first touch signal lines 41 coupled to each row of first touch electrodes 211 is the same as the number of the access points 41L of the first touch signal of each row of first touch electrodes 211.

In some embodiments, the number of first touch signal lines 41 coupled to each row of first touch electrodes 211 is one, and the number of the access point 41L of the first touch signal of each row of first touch electrodes 211 is one accordingly. For example, as shown in FIGS. 1 and 5, the number of first touch signal lines 41 coupled to the first touch electrodes 211 in the first row is one, and the number of the access points 41L of the first touch signal of the first touch electrodes 211 in the first row is one accordingly.

In some embodiments, the number of first touch signal lines 41 coupled to each row of first touch electrodes 211 is two, and the number of the access point 41L of the first touch signal of each row of first touch electrodes 211 is two.

Figure 5:
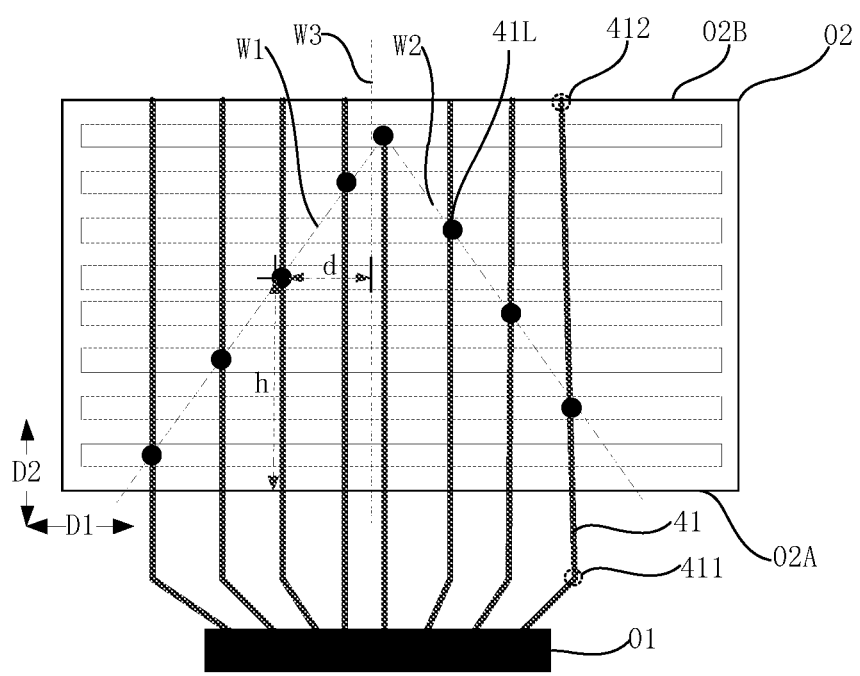
FIG. 5 is a top view of yet another array substrate, in accordance with some embodiments of this disclosure.

In some embodiments, referring to FIG. 5, orthographic projections of the access points 41L of the first touch signal of rows of first touch electrodes 211 on the base substrate 1 are arranged in an inverted V shape (a pattern formed by dotted lines W1 and W2 in FIG. 5).

The "inverted V shape" presented by arrangement of the orthographic projections of the access points 41L of the first touch signal of the rows of first touch electrodes 211 on the base substrate 1 will be described below with reference to FIG. 5.

As shown in FIG. 5, the first touch signal line 41 includes a first end 411 and a second end 412, and the first end 411 is configured to be connected to the touch chip 01. Two sides of the array substrate 02 extending in the first direction D1 are a first side 02A and a second side 02B, and in an extending direction of the first touch signal line 41 and in a direction from the first end 411 to the second end 412, the first side 02A is closer to the first end 411. A distance from respective access point 41L of the first touch signal to the first side 02A of the array substrate 02 is a first distance h.

A dividing line that divide the array substrate 02 into two parts equally in the first direction D1 is referred to as an intermediate line W3 of the array substrate 02. A distance from respective access point 41L of the first touch signal to the intermediate line W3 of the array substrate 02 is a second distance d.

A relationship between the second distance d and the first distance h that correspond to each access point 41L of the first touch signal is as follows: the second distance d increases as the first distance h decreases. That is, for the access points 41L of the first touch signal of the rows of first touch electrodes 211, the larger the first distance h from each access point 41L of the first touch signal to the first side 02A of the array substrate 02 is, the closer the access point 41L of the first touch signal is to the intermediate line W3 of the array substrate 02; and the smaller the first distance h from each access point 41L of the first touch signal to the first side 02A of the array substrate 02 is, the farther the first touch signal access points 41L are from the intermediate line W3 of the array substrate 02. In this way, orthographic projections of the access points 41L of the first touch signal of the rows of first touch electrodes 211 on the base substrate 1 are made to be arranged in an inverted V shape.

For example, as shown in FIG. 5, the first distance h from the access point 41L of the first touch signal of the first touch electrode 211 in the first row to the first side 02A of the array substrate 02 is the largest, and the access point 41L of the first touch signal of the first touch electrode 211 in the first row is closest to the intermediate line W3 of the array substrate 02. First distances h from the first touch signal access points 41L of the first touch electrodes 211 in the first row, the second row, the third row, the fourth row, the fifth row, the sixth row, the seventh row and the eighth row to the first side 02A of the array substrate 02 are sequentially and gradually decreased, and second distances d from the first touch signal access points 41L of the first touch electrodes 211 in the first row, the second row, the third row, the fourth row, the fifth row, the sixth row, the seventh row and the eighth row to the intermediate line W3 of the array substrate 02 are sequentially and gradually increased. In this way, orthographic projections of the first touch signal access points 41L of the first touch electrodes 211 in the first row, the second row, the third row, the fourth row, the fifth row, the sixth row, the seventh row and the eighth row on the base substrate 1 are arranged in an inverted V shape. In this way, among effective segments of respective first touch signal lines 41, that is, segments between respective access points 41L of the first touch signal of each first touch signal lines 41 and the first side 02A of the array substrate 02, longer ones are arranged closer to the middle of the array substrate 02, and shorter ones are arranged farther from the middle of the array substrate 02. Therefore, it is possible to reduce a probability for the effective segment of the first touch signal line 41 to be damaged when an edge portion of the array substrate 02 is damaged. For example, even if an upper left corner and/or an upper right corner of the array substrate 02 are damaged, the first touch signal line 41 will not be cut off.

As shown in FIGS. 6, 7a, 7b and 8, in some embodiments of this disclosure, a plurality of dummy touch signal lines 46 extending in the second direction D2 are disposed in the second conductive layer 4. By providing the plurality of dummy touch signal lines 46, it is possible to reduce attenuation of driving signals of each row of first touch electrodes 211, reduce a distortion rate of detection signals of each row of first touch electrodes 211, and thus further improve the positioning accuracy for the touch position in the touch phase.

Still, with the thin film transistor TFT of the array substrate 02 provided by the embodiments of this disclosure being exemplarily illustrated as a top-gate one, a manner in these embodiments to improve the positioning accuracy for the touch position in the touch phase by providing the plurality of dummy touch signal lines 46 extending in the second direction D2 on the second conductive layer 4 will be described in the following.

Figure 7A:
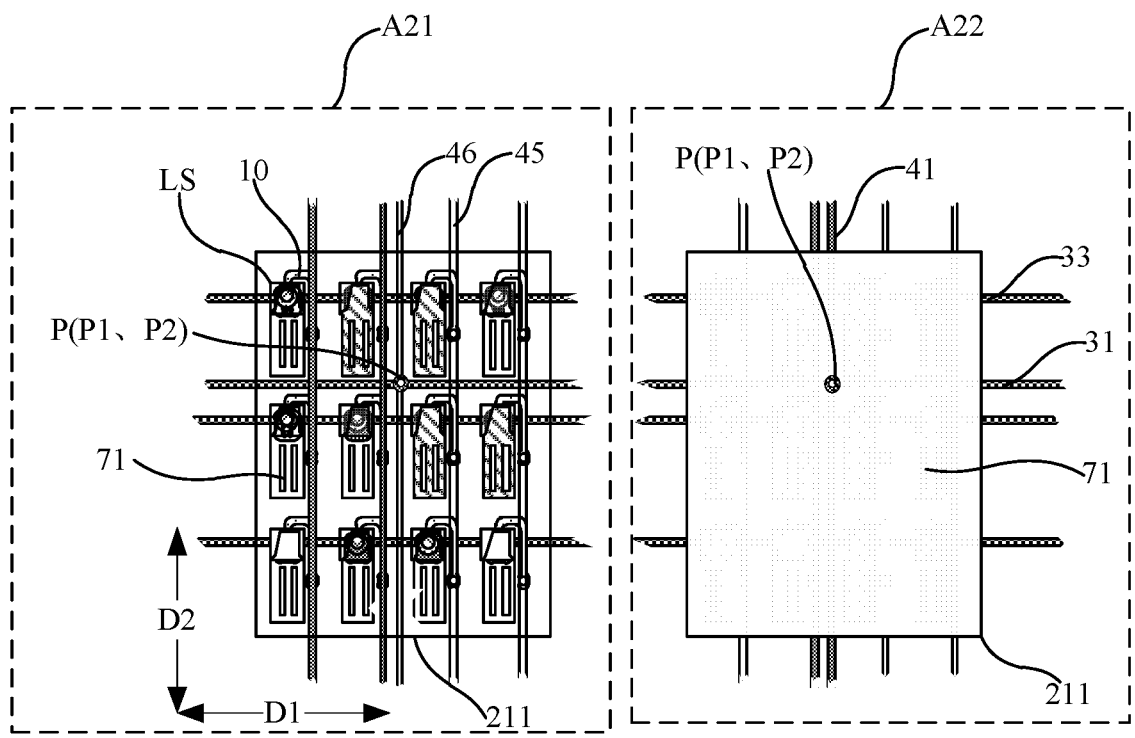
FIG. 7a is a layout view of the A21 part and the A22 part of the array substrate shown in FIG. 6.
Figure 7B:
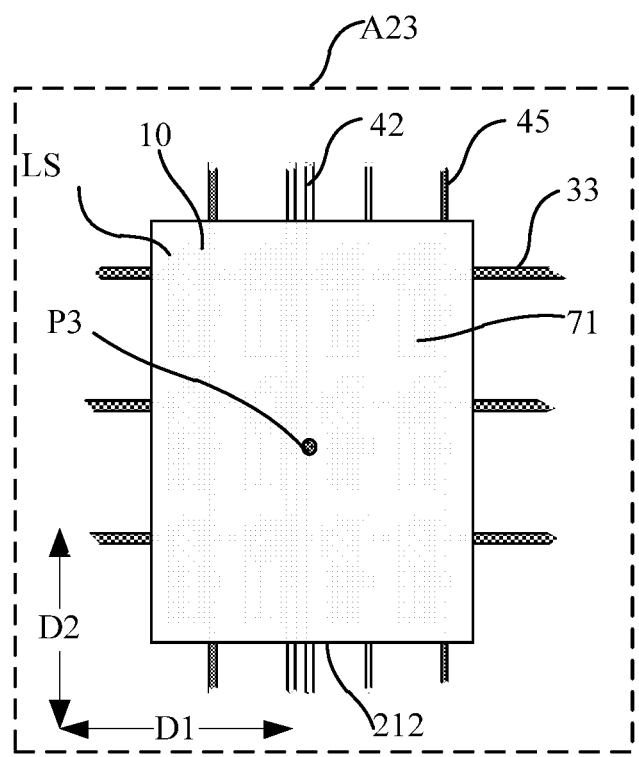
FIG. 7b is a layout view of the A23 part of the array substrate shown in FIG. 6.
Figure 8:
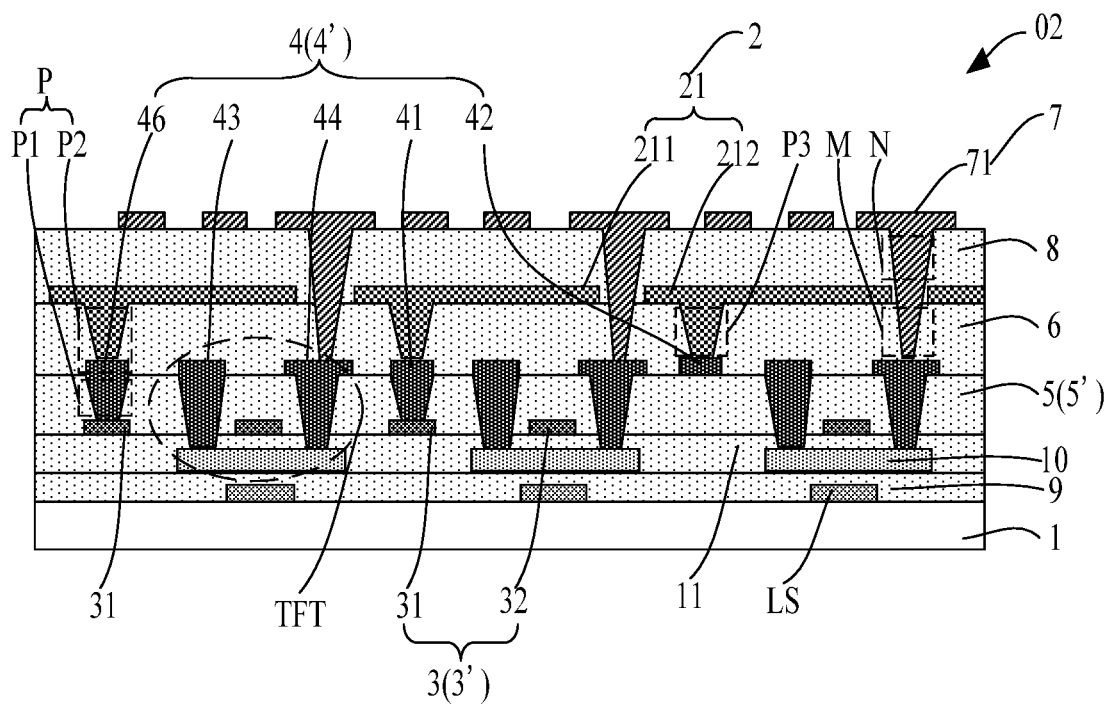
FIG. 8 is a schematic cross-sectional view of the array substrate shown in FIG. 6 along the section line B2-B2.

In some embodiments, as shown in FIG. 8, the plurality of dummy touch signal lines 46 is disposed on the second conductive layer 4 in the same layer as the plurality of first touch signal lines 41 and the plurality of second touch signal lines 42. As shown in FIGS. 7a and 7b, the dummy touch signal line 46 is arranged parallel to the first touch signal line 41 and the second touch signal line 42.

It will be understood that each first touch signal line 41, each second touch signal line 42, each source 43, each drain 44, each data line 45 and each dummy touch signal line 46 are electrically insulated from each other.

Figure 6:
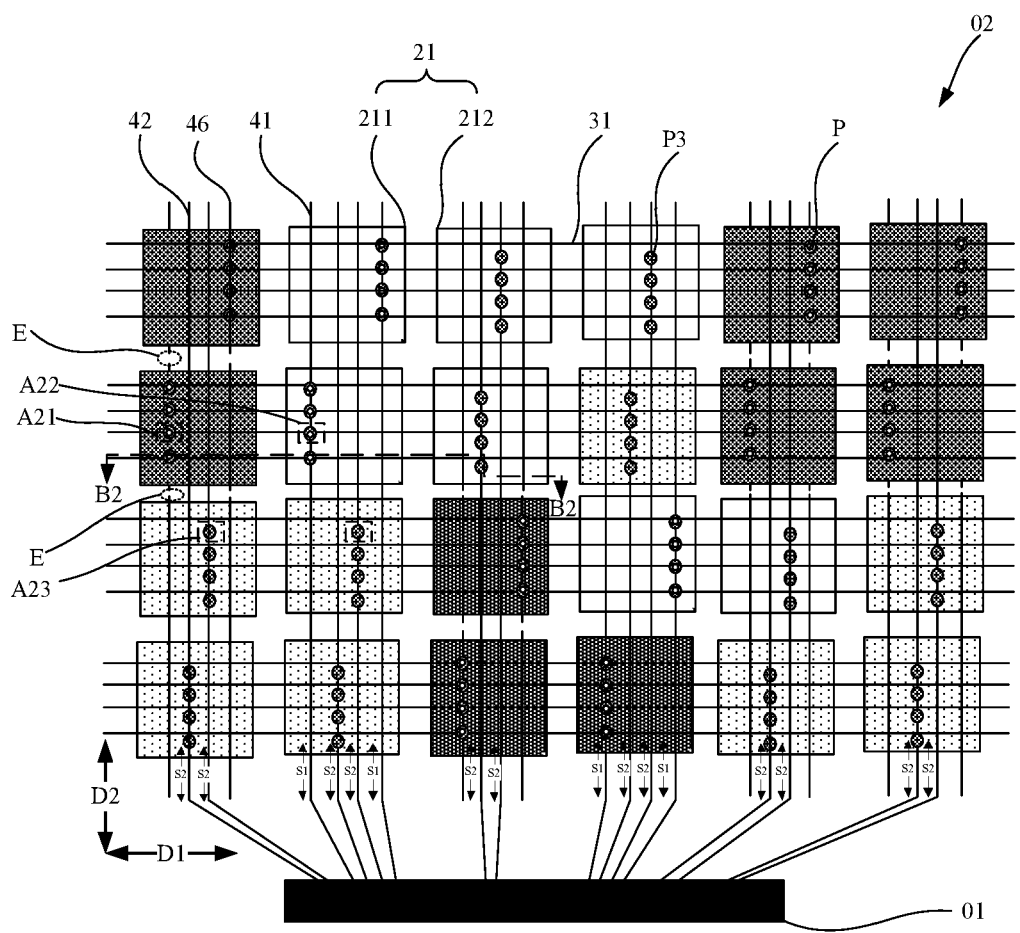
FIG. 6 is a top view of still another array substrate, in accordance with some embodiments of this disclosure.

As shown in FIG. 8, the first insulating layer 5 is provided between the first conductive layer 3 and the second conductive layer 4, and the plurality of first vias P1 extending through the first insulating layer 5 are defined in the first insulating layer 5. Referring to FIG. 6, each first touch electrode 211 in each row of first touch electrodes 211 corresponds to at least one column of first vias P1, with respective ones of each column of first vias P1 are arranged in the second direction D2.

Referring to FIGS. 6, 7a, 7b and 8, the second conductive layer 4 further includes a plurality of dummy touch signal lines 46 extending in the second direction D2. As shown in FIG. 6, for each row of the first touch electrodes 211, except the ones coupled to at least one first touch signal line 41, each of rest corresponds to at least one dummy touch signal line 46.

With continued reference to FIG. 6, each of the at least one dummy touch signal line 46 electrically connects the electrode connecting lines 31 passing through the column of first vias P1 through the column of first vias P1 corresponding to the first touch electrode 211 corresponding to the dummy touch signal line 46.

In this way, the plurality of dummy touch signal lines 46, the plurality of electrode connecting lines 31 and the plurality of first touch signal lines 41 form an electrically connected network with intersection points (at which trepanning structures P are located) being distributed on each first touch electrode 211 in each row of first touch electrode 211. In the touch phase, the first touch signal S1 is transmitted to each first touch electrode 211 in each row of first touch electrodes 211 through the network. Therefore, resistance of each first touch electrode 211 is reduced, the attenuation of driving signals of each row of first touch electrodes 211 is reduced, the distortion rate of detection signals of each row of first touch electrodes 211 is reduced, and the positioning accuracy for a touch position is further improved.

For example, the first touch electrodes 211 in the first row are taken as an example.

For the first touch electrodes 211 in the first row, except the one in the second column coupled to one first touch signal line 41, each of the rest three first touch electrodes 211 corresponds to one dummy touch signal line 46. Each dummy touch signal line 46 electrically connects the electrode connecting lines 31 passing through the column of first vias P1 through a column of first vias P1 corresponding to the first touch electrode 211 corresponding to the dummy touch signal line 46.

For example, the first touch electrode 211 in the first column and the first row corresponds to one dummy touch signal line 46, and the first touch electrode 211 corresponds to a column of first vias P1 which includes four first vias. The dummy touch signal line 46 electrically connects four electrode connecting lines 31 (i.e., the first, second, third and fourth electrode connecting lines 31 from the top) that pass through the four first vias P1.

Similarly, among the first touch electrodes 211 in the first row, the one in the third column and the one in the fourth column each correspond to one dummy touch signal line 46, and the two dummy touch signal lines 46 electrically connects the four electrode connecting lines 31.

In this way, three dummy touch signal lines, four electrode connecting lines 31 and one first touch signal line 41 that correspond to the first touch electrodes 211 in the first row form an electrically connected network with intersection points being distributed on each first touch electrode 211 of the first touch electrodes 211 in the first row. In the touch phase, the first touch signal S1 is transmitted to respective ones of the first touch electrodes 211 in the first row through the network.

In some embodiments, as shown in FIG. 6, the plurality of dummy touch signal lines 46 are a plurality of first touch signal lines 41 that are not connected to the touch chip 01, and at least one of the plurality of dummy touch signal lines 46 has a plurality of breaks E. That is, a difference between the plurality of dummy touch signal lines 46 and the plurality of first touch signal lines 41 is that the plurality of first touch signal lines 41 are connected to the touch chip 01, whereas the plurality of dummy touch signal lines 46 are not connected to the touch chip 01, and at least one of the plurality of dummy touch signal lines 46 has a plurality of breaks E.

In some other embodiments, the plurality of dummy touch signal lines 46 are not electrically connected to the touch chip 01, that is, each dummy touch signal line 46 of the plurality of dummy touch signal lines 46 does not have a break E.

In the embodiments of this disclosure, positions of the plurality of breaks E can be arranged at least in, including, but not limited to, the following three manners.

In the first one, as shown in FIG. 6, an orthographic projection of at least one of the plurality of breaks E on the base substrate 1 is located between orthographic projections of two adjacent first touch electrodes 211 in the second direction D2 on the base substrate. That is, the at least one of the plurality of breaks E is between two adjacent first touch electrodes 211 in the second direction D2. It can also be said that the at least one of the plurality of dummy touch signal lines 46 is disconnected between two adjacent first touch electrodes 211 in the second direction D2. For example, as shown in FIG. 6, the first dummy touch signal line 46 is disconnected between the first touch electrode 211 in the first row and first column and the first touch electrode 211 in the second row and first column.

It will be understood that, when the first touch signal S1 is loaded on the first touch electrode 211 in the second row and first column, the first touch signal S1 is also loaded on the dummy touch signal line 46 coupled to the first touch electrode 211 in the second row and first column; thus if the dummy touch signal line 46 is not disconnected between the first touch electrode 211 in the first row and first column and the first touch electrode 211 in the second row and first column, the dummy touch signal line 46 loaded with the first touch signal S1 will affect the first touch electrode 211 in the first row and first column, which easily causes a signal crosstalk between the first touch electrodes 211 in the first row and the first touch electrodes 211 in the second row, thus affecting the positioning accuracy for the touch position.

In the second one, as shown in FIG. 6, an orthographic projection of at least one of the plurality of breaks E on the base substrate 1 is located between orthographic projections of a first touch electrode 211 and a second touch electrode 212 that are adjacent to each other in the second direction D2 on the base substrate 1. That is, the at least one of the plurality of breaks E is between the first touch electrode 211 and the second touch electrode 212 that are adjacent to each other in the second direction D2. It can also be said that at least one of the plurality of dummy touch signal lines 46 is disconnected between the first touch electrode 211 and the second touch electrode 212 that are adjacent to each other in the second direction D2. For example, as shown in FIG. 6, the first dummy touch signal line 46 is disconnected between the first touch electrode 211 in the second row and first column and the second touch electrode 212 in the third row and first column.

It will be understood that, in the touch phase, the first touch signal S1 loaded on the first touch electrode 211 in the second row and first column and the second touch signal S2 loaded on the second touch electrode 212 in the third row and first column are two different types of signals. As for the two different types of signals, one is a driving signal, and the other is a sensing signal. If the dummy touch signal line 46 is not disconnected between the first touch electrode 211 in the second row and first column and the second touch electrode 212 in the third row and first column, the first touch signal S1 loaded on the first touch electrode 211 in the second row and first column and the second touch signal S2 loaded on the second touch electrode 212 in the third row and first column are easily interfered with each other, which affects the positioning accuracy for the touch position.

In the third one, an orthographic projection of at least one of the plurality of breaks E on the base substrate 1 is located between orthographic projections of two adjacent first touch electrodes 211 in the second direction D2 on the base substrate 1. Moreover, an orthographic projection of at least one of the plurality of breaks E on the base substrate 1 is located between orthographic projections of a first touch electrode 211 and a second touch electrode 212 that are adjacent to each other in the second direction D2 on the base substrate 1.

Still, with the thin film transistor TFT of the array substrate 02 provided by the embodiments of this disclosure being exemplarily illustrated as a top-gate one, a manner in which each second touch electrode 212 or each column of second touch electrodes 212 arranged in the second direction D2 are coupled with the second touch signal line 42 will be described in the following. It will be understood that the embodiments of this disclosure include, but are not limited to, implementations provided in the following embodiments.

In some embodiments, as shown in FIG. 8, a plurality of third vias P3 extending through the second insulating layer 6 are defined in the second insulating layer 6. Referring to FIG. 6, each second touch electrode 212 is coupled to at least one second touch signal line 42 through at least one of the plurality of third vias P3.

With continued reference to FIG. 6, in some embodiments, each second touch electrode 212 corresponds to at least one column of third vias P3, and respective ones of each column of third vias P3 are arranged in the second direction D2.

Based on this, each of at least one second touch signal line 42 coupled to each second touch electrode 212 is extended in the second direction D2 and is coupled to the second touch electrode 212 through a column of third vias P3 corresponding to the second touch electrode 212.

For example, as shown in FIG. 6, the second touch electrode 212 in the fourth row and first column is coupled with one second touch signal line 42 which extending in the second direction D2. The second touch electrode 212 in the fourth row and first column corresponds to a column of third vias P3 which includes four third vias P3 arranged in the second direction D2. The second touch signal line 42 is coupled to the second touch electrode 212 in the fourth row and first column through the four third vias P3.

Figure 9:
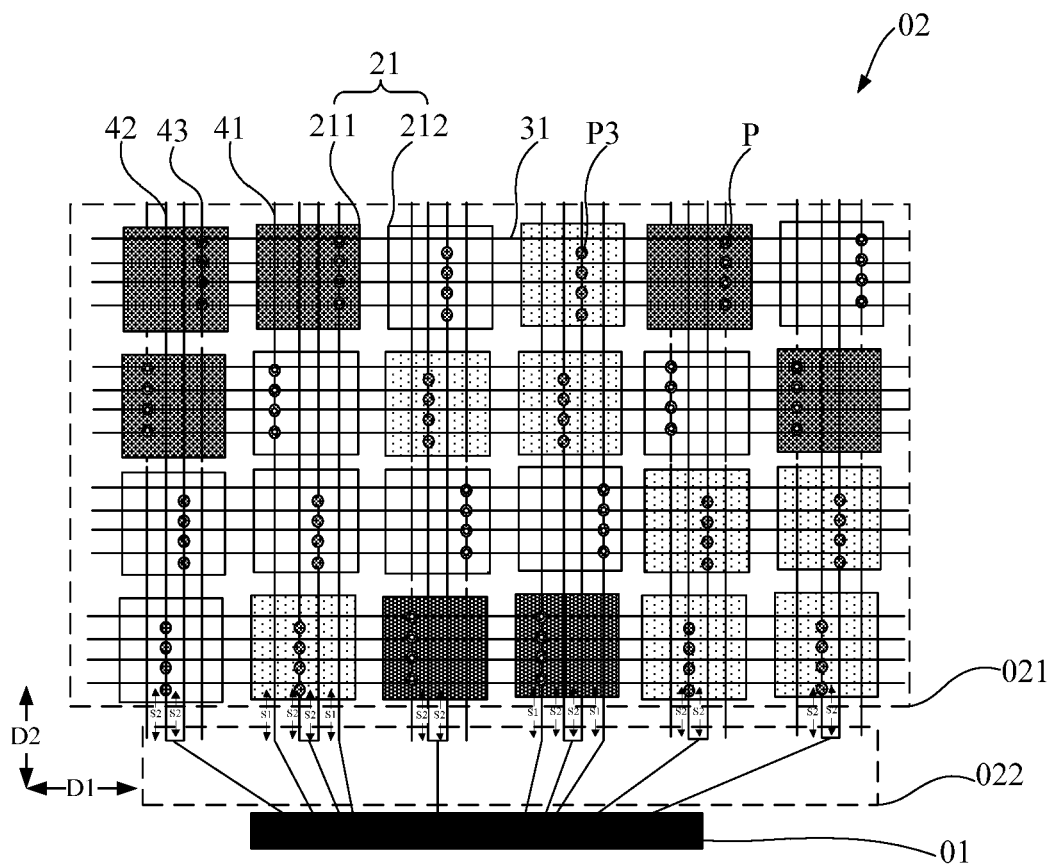
FIG. 9 is a top view of yet another array substrate, in accordance with some embodiments of this disclosure.

It will be understood that, as shown in FIG. 9, the array substrate provided in the embodiments of this disclosure has a touch area 021 and a peripheral area 022 located at at least a side of the touch area 021. For example, in some embodiments, as shown in FIG. 9, the peripheral area 022 is located at a lower side of the touch area 021 in the second direction D2.

With continued reference to FIG. 9, in some embodiments, the second touch signal lines 42 coupled to each column of second touch electrodes 212 are coupled to each other in the peripheral area 022, so that each column of second touch electrodes 212 is connected in series.

For example, as shown in FIG. 9, two of the second touch electrodes 212 in the first column each are coupled with one second touch signal line 42, and the two second touch signal lines 42 are coupled to each other in the peripheral area 022, so that the two of the second touch electrodes 212 in the first column are connected in series.

In some embodiments, as shown in FIG. 8, a plurality of third vias P3 extending through the second insulating layer 6 are defined in the second insulating layer 6. Referring to FIG. 10, each column of second touch electrodes 212 is coupled to at least one second touch signal line 42 through at least one of the plurality of third vias P3.

It will be exemplarily illustrated in FIG. 10 that each column of second touch electrodes 212 is coupled to one second touch signal line 42 through eight of the plurality of third vias P3. It will be understood that the embodiments of this disclosure include, but are not limited to this.

With continued reference to FIG. 10, each column of second touch electrodes 212 corresponds to at least one column of third vias P3, and respective ones of each column of third vias P3 are arranged in the second direction D2 and correspond to respective ones of each column of second touch electrodes 212, respectively. Each of the at least one second touch signal line 42 coupled to each column of second touch electrodes 212 extends in the second direction D2 and is coupled to the column of second touch electrodes 212 through a column of third vias P3 corresponding to the column of second touch electrodes 212.

For example, as shown in FIG. 10, a first column of second touch electrodes 212 is taken as an example.

The first column of second touch electrodes 212 corresponds to a column of third vias P3, and the column of second touch electrodes 212 includes two second touch electrodes 212, and the column of third vias P3 includes eight third vias P3. Each of the two second touch electrodes 212 corresponds to four third vias P3. The column of second touch electrodes 212 is coupled with a second touch signal line 42 extending in the second direction D2. The second touch signal line 42 is coupled to the first column of second touch electrodes 212 through the eight third vias P3.

Figure 11:
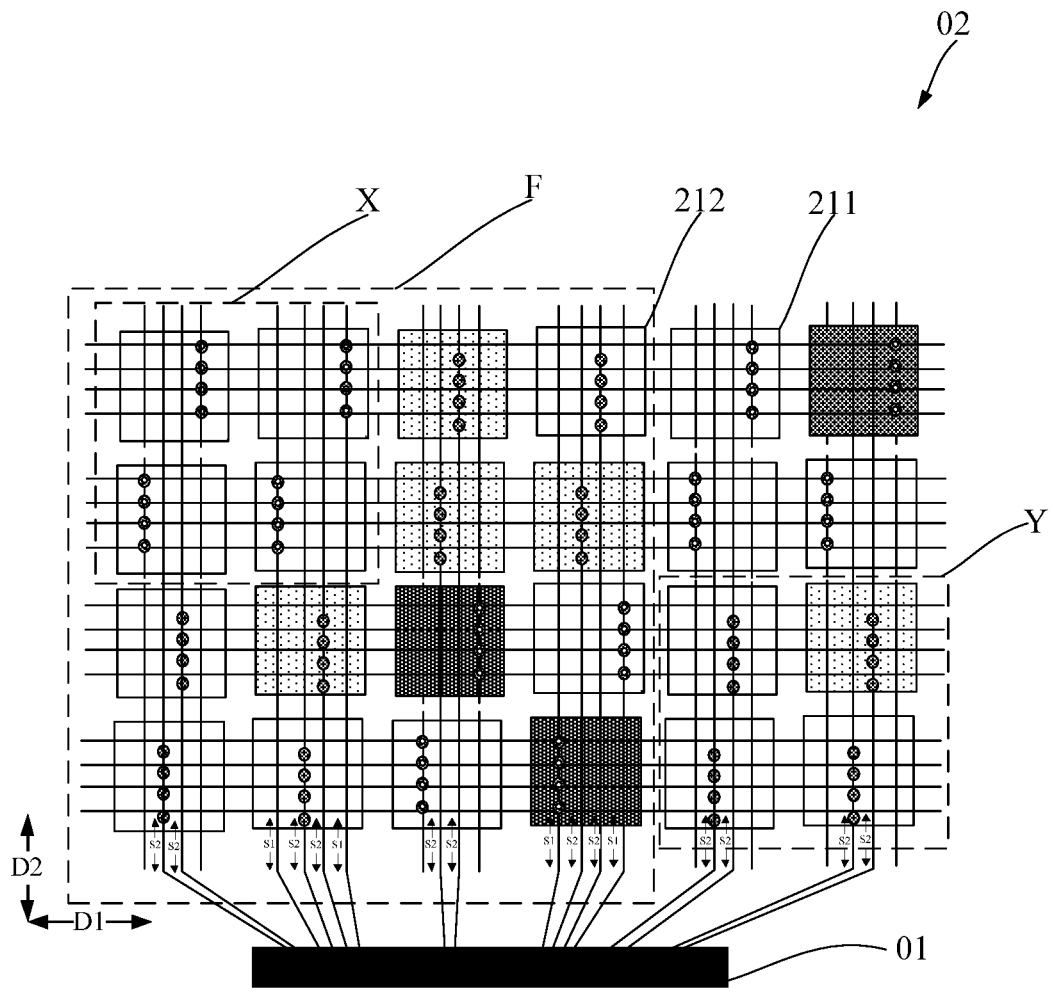
FIG. 11 is a top view of yet another array substrate, in accordance with some embodiments of this disclosure.
Figure 12:
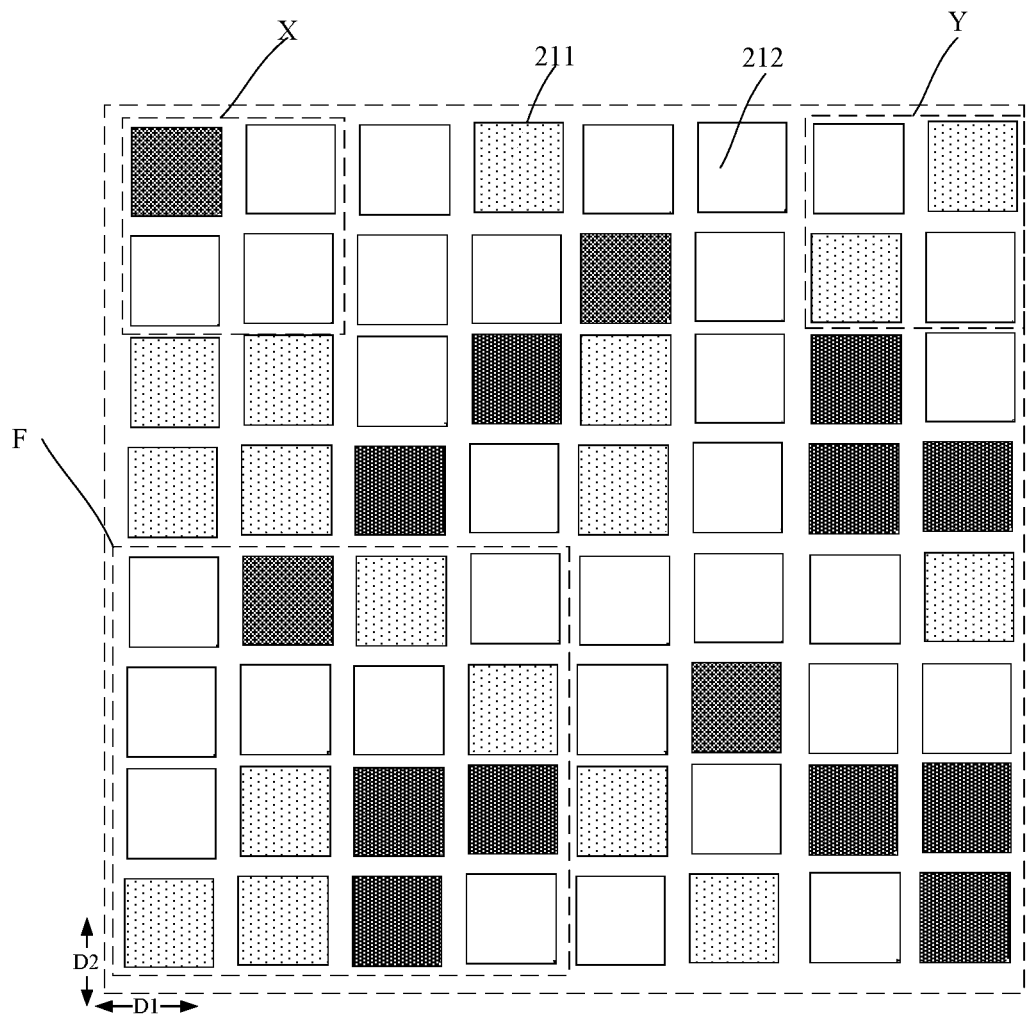
FIG. 12 is a top view of yet another array substrate, in accordance with some embodiments of this disclosure.

Referring to FIGS. 11 and 12, in some embodiments, a part of common electrodes 21 of the plurality of common electrodes 21 are also used as the first touch electrodes 211 to form a plurality of first touch units X. The other part of common electrodes 21 of the plurality of common electrodes 21 are also used as the second touch electrodes 212 to form a plurality of second touch units Y.

With continued reference to FIG. 11, in some embodiments, each of the plurality of first touch units X includes at least one first touch electrode 211; and each of the plurality of second touch units Y includes at least one second touch electrode 212.

For example, as shown in FIG. 11, among twenty-four common electrodes 21, twelve of them are also used as the first touch electrodes 211 to form three first touch units X each including four first touch electrodes 211. Among the twenty-four common electrodes, twelve common electrodes 21 are also used as the second touch electrodes 212 to form three second touch units Y each including four second touch electrodes 212.

In the embodiments provided in this disclosure, an arrangement of the first touch unit X and the second touch unit Y can be made in, including, but not limited to, the following three manners.

I. As shown in FIG. 12, in some embodiments, the first touch unit X and the second touch unit Y are alternately arranged in the first direction D1.

II. As shown in FIG. 12, in some embodiments, the first touch unit X and the second touch unit Y are alternately arranged in the second direction D2.

III. As shown in FIG. 12, in some embodiments, the first touch unit X and the second touch unit Y are alternately arranged in the first direction D1 and alternately arranged in the second direction D2. In this way, the first touch unit X and the second touch unit Y may be uniformly distributed in the entire touch area, thereby improving the touch effect.

In some embodiments, the first touch unit X includes two to eight first touch electrodes 211; and the second touch unit Y includes two to eight second touch electrodes 212. In FIG. 12, it is only exemplarily illustrated that the first touch unit X includes four first touch electrodes 211 and the second touch unit Y includes four second touch electrodes 212.

In some embodiments, as shown in FIGS. 11 and 12, the touch area 021 of the array substrate 02 is divided into a plurality of sub-areas F, and two first touch units X and two second touch units Y are arranged in each of the plurality of sub-areas F; each first touch unit X includes four first touch electrodes 211, and each second touch unit Y includes four second touch electrodes 212.

That is, as shown in FIGS. 11 and 12, in the touch area 021 of the array substrate, sixteen of the plurality of common electrodes 21 are divided into one sub-area F to form a plurality of sub-areas F. Eight of the sixteen common electrodes 21 are also used as the first touch electrodes 211 to form two first touch units X each including four first touch electrodes 211. Eight of the sixteen common electrodes 21 are also used as the second touch electrodes 212 to form two second touch units Y each including four second touch electrodes 212.

That is, in the touch area 021 of the array substrate, sixteen common electrodes 21 of the plurality of common electrodes 21 are designed as one group. Of course, other numbers of common electrodes 21 may be designed as one group, for example, fifteen common electrodes 21 are designed as one group, seventeen common electrodes 21 are designed as one group, or eighteen common electrodes 21 are designed as one group.

In some embodiments, a gap between the adjacent first X and second Y touch units may not be a completely linear one, for example, it may be set as a curved or fold-line type, so as to form a better touch effect.

In the embodiments of this disclosure, a shape of respective one (i.e., respective first touch electrode 211 and respective second touch electrode 212) of the plurality of common electrodes includes various shapes, such as a square, a rectangle, a diamond, a polygon, etc. In the embodiments described above and the embodiments described below, the shape of respective one of the plurality of common electrodes is exemplarily illustrated as a square. It will be understood that the embodiments of this disclosure include, but are not limited to this.

In the embodiments of this disclosure, respective one (i.e., respective first touch electrode 211 and respective second touch electrode 212) of the plurality of common electrodes has a same shape. Or a shape of at least one of the plurality of common electrodes is different from a shape of other ones of the plurality of common electrodes.

In the embodiments of this disclosure, respective one of the plurality of common electrodes (i.e., respective first touch electrode 211 and respective second touch electrode 212) has a same size. Or a size of at least one common electrode of the plurality of common electrodes is different from a size of other ones of the plurality of common electrodes.

In the embodiments of this disclosure, a shape of respective one 211 of the plurality of first touch electrodes 211 is the same as a shape of respective one of the plurality of second touch electrodes 212. For example, as shown in FIG. 3, the shape of respective one of the plurality of first touch electrodes 211 and the shape of respective one of the plurality of second touch electrodes 212 are both a square, a rectangle or a rhombus. Or the shape of respective one of the plurality of first touch electrodes 211 is different from the shape of respective one of the plurality of second touch electrodes 212.

In the embodiments of this disclosure, a size of respective one of the plurality of first touch electrodes 211 is equal to a size of respective one of the plurality of second touch electrodes 212. For example, as shown in FIG. 3, the size of respective one of the plurality of first touch electrodes 211 is equal to the size of respective one of the plurality of second touch electrodes 212. Or the size of respective one of the plurality of first touch electrodes 211 is not equal to the size of respective one of the plurality of second touch electrodes 212.

Figure 13:
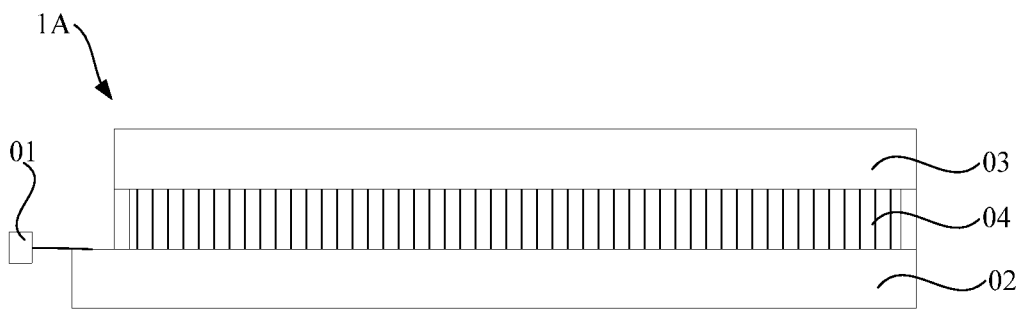
FIG. 13 is a side view showing a structure of a touch display device, in accordance with some embodiments of this disclosure.

As shown in FIG. 13, the embodiments of this disclosure also provide a touch display device 1A, which includes the array substrate 02 in any of the above embodiments and a touch chip 01.

Referring to FIG. 1, the touch chip 01 is coupled to the plurality of first touch signal lines 41 and the plurality of second touch signal lines 42 in the array substrate 02. The touch chip 01 is configured to supply the first touch signal S1 required for the touch position detection to each of the plurality of first touch signal lines 41, and to supply the second touch signal S2 required for touch position detection to each of the plurality of second touch signal lines 42.

Referring to FIG. 13, in some embodiments, the touch display device 1A is a liquid crystal display device, and the touch display device 1A may further include: an opposite substrate 03 disposed opposite to the array substrate 02; and a liquid crystal layer 04 disposed between the array substrate 02 and the opposite substrate 03.

For example, the opposite substrate 03 may be a color film substrate; or in a case where the array substrate 02 is a color-filter-on-array (COA) array substrate, that is, in a case where a color filter film is manufactured on the array substrate 02, the opposite substrate 03 may be a cover plate, for example, a cover glass.

In a case where the touch display device 1A described above is a liquid crystal display device, each sub-pixel in the array substrate 02 includes a pixel electrode and a common electrode. After the array substrate 02 and the opposite substrate 03 are encapsulated in a cell to form a liquid crystal display panel included in the liquid crystal display device, the liquid crystal display panel may be an advanced-super dimensional switching (AD-SDS) panel in which an edge electric field can be generated between the pixel electrode and the common electrode on a side of the array substrate 02 to deflect all aligned liquid crystal molecules between and above the electrodes in a plane direction parallel to a display surface of the display panel, thus improving a light transmission efficiency of the liquid crystal layer with an increased viewing angle.

The touch display device 1A may further include a backlight module for providing backlight, a driving circuit portion, etc., and a detailed structure thereof will not be described herein.

The touch display device 1A provided by the embodiments of this disclosure may be any device that displays images whether moving (e.g., videos) or stationary (e.g., still images), and literal or graphical. More specifically, it is contemplated that the embodiments may be implemented in or associated with a variety of electronic devices which include but are not limited to mobile phones, wireless devices, portable android devices (PADs), handheld or portable computers, global positioning system (GPS) receivers/navigators, cameras, MPEG-4 Part 14 (MP4) video players, camcorders, game consoles, watches, clocks, calculators, TV monitors, planarization panel displays, computer monitors, car displays (e.g., odometer displays, etc.), navigators, cockpit controllers and/or displays, camera view displays (e.g., rearview camera displays in vehicles), electronic photographs, electronic billboards or signs, projectors, architectural structures, packagings, and aesthetic structures (e.g., displays for displaying an image of a piece of jewelry), etc.

The embodiments of this disclosure provide a method of driving the array substrate 02, which is applied to the array substrate 02 as described in any of the above embodiments. The method includes a plurality of driving cycles each of which includes a display phase and a touch phase.

The display phase includes S11.

In S11, a common voltage signal is transmitted to respective common electrode of the array substrate.

The touch phase includes S11 to S12.

In S12, a first touch signal is sequentially transmitted to each row of first touch electrodes of the array substrate row by row.

In S13, a second touch signal is obtained from each second touch electrode or each column of second touch electrodes of the array substrate.

The embodiments of this disclosure provide another method of driving the array substrate 02, which is applied to the array substrate 02 as described in any of the above embodiments. The method includes a plurality of driving cycles each of which includes a display phase and a touch phase. The display phase includes S21.

In S21, a common voltage signal is transmitted to respective common electrode of the array substrate.

The touch phase includes S22 to S23.

In S22, a second touch signal is sequentially transmitted to each second touch electrode of the array substrate one by one; or the second touch signal is sequentially transmitted to each column of second touch electrodes of the array substrate column by column.

In S23, a first touch signal is obtained from each row of first touch electrodes of the array substrate.

Figure 14:
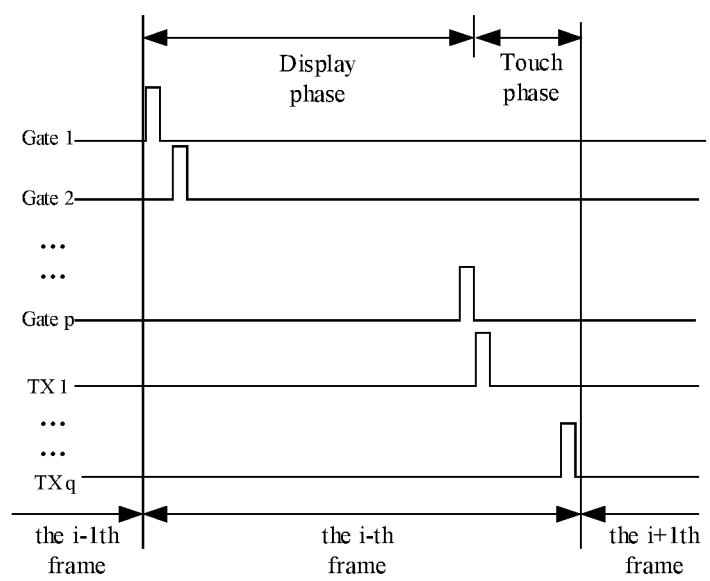
FIG. 14 is a timing diagram of driving the array substrate, in accordance with some embodiments of this disclosure.

Referring to FIG. 14, a driving timing sequence is exemplarily given, and the two methods of driving the array substrate will be illustrated below by taking the i-th frame as an example with reference to FIGS. 1 and 14.

In the display phase, a gate scanning signal is sequentially transmitted to each gate signal line Gate1, Gate2 . . . Gate p of the array substrate 02, a common electrode signal is transmitted to respective common electrode 21 in the common electrode layer 2 which cooperates with the pixel electrode layer 7 to form an electric field to drive respective sub-pixel for displaying, so as to realize the display function.

In a case where respective first touch electrode strip 211C is configured as a driving electrode, and respective second touch electrode 212 or respective second touch electrode strip 212C is configured as a sensing electrode, in the touch phase, the touch chip 01 sequentially transmits driving signals (i.e., the first touch signals S1) TX1, TX2 . . . TX q to each row of first touch electrode strips 211C row by row, and sensing signals (the second touch signals S2) RX1, RX2 . . . RX q generated under driving signals TX1, TX2 . . . TX q are obtained from each second touch electrode 212 or each column of second touch electrode strips 212C, so as to realize the mutual capacitive touch function.

In a case where respective first touch electrode strip 211C is configured as a sensing electrode and respective second touch electrode 212 or respective second touch electrode strip 212C is configured as a driving electrode, in the touch phase, the touch chips 01 sequentially transmits driving signals TX1, TX2 . . . TXq to each second touch electrode 212 one by one, or sequentially transmits driving signals TX1, TX2 . . . TXq to each column of second touch electrode strips 212C column by column, and Sensing signals RX1, RX2 . . . RXq generated under driving signals TX1, TX2 . . . TXq are obtained from each row of first touch electrode strips 211C, so as to realize the mutual capacitive touch function.

In this way, by using the method of driving the array substrate provided in the embodiments of this disclosure, the display function and the mutual capacitive touch function can be implemented in different time periods.

In order to more clearly illustrate and understand the above embodiments provided in this disclosure, the embodiments of this disclosure provide a method of manufacturing the array substrate 02.

It will be noted that the embodiments provided below are illustrated by taking the array substrate 02 shown in FIG. 8 as an example. It will be understood that the method of manufacturing the array substrate 02 provided by the embodiments of this disclosure includes, but is not limited to this.

The method of manufacturing the array substrate 02 provided in the embodiments of this disclosure includes S1 to S5.

In S1, a gate electrode layer 3' is formed on the base substrate 1 through a single patterning process; the gate electrode layer 3' includes a plurality of gate lines, a plurality of gates 32 and a plurality of electrode connecting lines 31.

In S2, a first insulating layer 5 is formed on a side of the gate electrode layer 3' away from the base substrate 1 with a plurality of first vias P1 extending through the first insulating layer 5 being defined in the first insulating layer 5.

In S3, a source-drain electrode layer 4' is formed on a side of the first insulating layer 5 away from the base 1 substrate 1 through a single patterning process; the source-drain electrode layer 4' includes a plurality of first touch signal lines 41, a plurality of second touch signal lines 42, a plurality of sources 43, a plurality of drains 44, a plurality of data lines and a plurality of dummy touch signal lines 46.

Each of the plurality of first touch signal lines 41 and each of the plurality of dummy touch signal lines 46 is electrically connected to some of the plurality of electrode connecting lines 31 through some of the plurality of first vias P1.

In S4, a second insulating layer 6 is formed on a side of the source-drain electrode layer 4' away from the base substrate 1 with a plurality of second vias P2 extending through the second insulating layer 6 being defined in the second insulating layer 6.

In S5, a common electrode layer 2 is formed on a side of the second insulating layer 6 away from the base substrate 1; and the common electrode layer 2 includes a plurality of common electrodes 21.

Among the plurality of common electrodes 21, each of the ones which are also used as the first touch electrode 211 is coupled to one first touch signal line 41 or one dummy touch signal line 46 through some of the plurality of second vias P2, and each of the ones which are also used as the second touch electrode 212 is coupled to one second touch signal line 42 through some of the plurality of second vias P2.

The method of manufacturing the array substrate 02 provided in the embodiments of this disclosure further includes, before S1, S01 to S04.

In S01, a light-shielding layer LS is formed on the base substrate 1, with an orthographic projection of the light-shielding layer LS on the base substrate 1 covering at least an area between the source 43 and the drain 44 of the thin film transistor TFT to be formed (i.e., an area where a channel is formed in a case where the thin film transistor TFT is turned on).

In S02, a buffer layer 9 is formed on a side of the light-shielding layer LS away from the base substrate 1.

In S03, a plurality of active layers 10 are formed on a side of the buffer layer 9 away from the base substrate 1.

In S04, a gate insulating layer 11 is formed on a side of the plurality of active layers 10 away from the base substrate 1.

It will be noted that a source via for making the source 43 in electrical contact with the active layer 10 and a drain via for making the drain 44 in electrical contact with the active layer 10 are also defined in the first insulating layer 5 and the gate insulating layer 11. In a process of forming the source-drain electrode layer 4', the source forms the electrical contact with the active layer 10 through the source via, and the drain 44 forms the electrical contact with the active layer 10 through the drain via.

The method of manufacturing the array substrate 02 provided in the embodiments of this disclosure further includes:

S41, in which a plurality of vias M extending through the second insulating layer 6 are defined in the second insulating layer 6 after the second insulating layer 6 is formed in S4 and before the common electrode layer 2 is formed on the second insulating layer 6 in S5.

S6, in which a third insulating layer 8 is formed on a side of the common electrode layer 2 away from the base substrate 1 with a plurality of vias N extending through the third insulating layer 8 being defined in the third insulating layer 8.

S7, in which a pixel electrode layer 7 is formed on a side of the third insulating layer 8 away from the base substrate 1; and the pixel electrode layer 7 includes a plurality of pixel electrodes 71 each of which is in electrical contact with the drain 44 sequentially through the via M and the via N.

The forgoing descriptions are merely specific implementations of this disclosure, but the protection scope of this disclosure is not limited thereto. Any person skilled in the art could conceive of changes or replacements within the technical scope of this disclosure, which shall all be included in the protection scope of this disclosure. Therefore, the protection scope of this disclosure shall be subject to the protection scope of the claims.

What is claimed is:
1. An array substrate, comprising:
a base substrate;
a common electrode layer disposed on a side of the base substrate, wherein the common electrode layer includes a plurality of common electrodes arranged in an array, a part of common electrodes of the plurality of common electrodes are also used as first touch electrodes, and another part of common electrodes of the plurality of common electrodes are also used as second touch electrodes;
a first conductive layer disposed on a side of the common electrode layer proximate to or away from the base substrate, wherein the first conductive layer includes a plurality of electrode connecting lines, and each row of first touch electrodes arranged in a first direction is connected in series by at least one of the plurality of electrode connecting lines;
a second conductive layer disposed on a side of the common electrode layer proximate to or away from the base substrate, wherein the second conductive layer includes a plurality of first touch signal lines and a plurality of second touch signal lines; each row of first touch electrodes arranged in the first direction is coupled to at least one first touch signal line of the plurality of first touch signal lines, and each first touch signal line is configured to transmit a first touch signal; each second touch electrode or each column of second touch electrodes arranged in a second direction is coupled to at least one of the plurality of second touch signal lines, and each second touch signal line is configured to transmit a second touch signal; and
wherein the first direction intersects the second direction.
2. The array substrate according to claim 1, wherein
the first conductive layer is a gate electrode layer, and is located between the base substrate and the common electrode layer; and
the second conductive layer is a source-drain electrode layer, and is located between the gate electrode layer and the common electrode layer.
3. The array substrate according to claim 2, wherein the array substrate further comprises:
a first insulating layer disposed between the first conductive layer and the second conductive layer, a plurality of first vias extending through the first insulating layer being defined in the first insulating layer; and
a second insulating layer disposed between the second conductive layer and the common electrode layer, a plurality of second vias extending through the second insulating layer being defined in the second insulating layer, wherein
each row of first touch electrodes is coupled to the at least one of the electrode connecting lines sequentially through some of the plurality of second vias and some of the plurality of first vias.
4. The array substrate according to claim 3, wherein the plurality of first vias are in one-to-one correspondence with the plurality of second vias, and an orthographic projection of each of the plurality of first vias on the base substrate at least partially overlaps with an orthographic projection of a corresponding second via on the base substrate, so that the first via and the corresponding second via form a trepanning structure.
5. The array substrate according to claim 4, wherein each row of first touch electrodes corresponds to at least one row of trepanning structures; with respective ones of each row of trepanning structures being arranged in the first direction and corresponding to respective ones of each row of first touch electrodes, respectively, and each of the at least one electrode connecting line that serially connects each row of first touch electrodes extends in the first direction, and is coupled to the first touch electrodes in the row of first touch electrodes through a row of trepanning structures corresponding to the row of first touch electrodes.

6. The array substrate according to claim 3, wherein each row of first touch electrodes is coupled to the at least one first touch signal line through at least one of the plurality of second vias.

7. The array substrate according to claim 6, wherein each first touch electrode in each row of first touch electrodes corresponds to at least one column of second vias, with respective ones of each column of second vias being arranged in the second direction; and each of the at least one first touch signal line coupled to each row of first touch electrodes extends in the second direction; and is coupled to the row of first touch electrodes through a column of second vias corresponding to a first touch electrode in the row of first touch electrodes.

8. The array substrate according to claim 7, each of the at least one first touch signal line coupled to each row of first touch electrodes being coupled to the row of first touch electrodes through a column of second vias corresponding to a first touch electrode in the row of first touch electrodes, wherein a position of the column of second vias corresponding to the first touch electrode is an access point of a first touch signal of the row of first touch electrodes; and orthographic projections of the access points of first touch signals of all rows of first touch electrodes on the base substrate are arranged in an inverted V shape.

9. The array substrate according to claim 7, wherein each first touch electrode in each row of first touch electrodes corresponds to at least one column of first vias, with respective ones of each column of first vias being arranged in the second direction;

the second conductive layer further includes a plurality of dummy touch signal lines extending in the second direction; for each row of first touch electrodes, except ones coupled to the at least one first touch signal line, each of the rest corresponds to at least one dummy touch signal line; and each of the at least one dummy touch signal line electrically connects electrode connecting lines passing through the column of first vias through the column of first vias corresponding to the first touch electrode corresponding to the dummy touch signal line.

10. The array substrate according to claim 9, wherein the at least one of the plurality of dummy touch signal lines has a plurality of breaks;

an orthographic projection of at least one of the plurality of breaks on the base substrate is located between orthographic projections of two first touch electrodes adjacent in the second direction on the base substrate; and/or the orthographic projection of the at least one of the plurality of breaks on the base substrate is located between orthographic projections of one first touch electrode and one second touch electrode that are adjacent in the second direction on the base substrate.

11. The array substrate according to claim 2, further comprising:

the second insulating layer disposed between the second conductive layer and the common electrode layer, wherein a plurality of third vias extending through the second insulating layer are defined in the second insulating layer; and each second touch electrode or each column of second touch electrodes is coupled to the at least one second touch signal line through at least one third via of the plurality of third vias.

12. The array substrate according to claim 11, wherein each second touch electrode corresponds to at least one column of third vias, with respective ones of each column of third vias being arranged in the second direction; and each of the at least one second touch signal line coupled to each second touch electrode extends in the second direction, and is coupled to the second touch electrode through a column of third vias corresponding to the second touch electrode.

13. The array substrate according to claim 12, wherein the array substrate has a touch area, and a peripheral area located at at least one side of the touch area; and second touch signal lines coupled to each column of second touch electrodes are coupled to each other in the peripheral area.

14. The array substrate according to claim 11, wherein each column of second touch electrodes corresponds to at least one column of third vias, with respective ones of each column of third vias being arranged in the second direction, and corresponding to respective ones in each column of second touch electrodes, respectively; and each of the at least one second touch signal line coupled to each column of second touch electrodes extends in the second direction, and is coupled to the column of second touch electrodes through a column of third vias corresponding to the column of second touch electrodes.

15. The array substrate according to claim 1, the common electrode layer including a plurality of first touch units and a plurality of second touch units, wherein each of the plurality of first touch units includes at least one first touch electrode; and each of the plurality of second touch units includes at least one second touch electrodes.

16. The array substrate according to claim 15, wherein the first touch unit and the second touch unit are alternately arranged in the first direction; and/or the first touch unit and the second touch unit are alternately arranged in the second direction.

17. The array substrate according to claim 16, wherein the first touch unit includes 2 to 8 first touch electrodes; and the second touch unit includes 2 to 8 second touch electrodes.

18. The array substrate according to claim 17, wherein the touch area of the array substrate is divided into a plurality of sub-areas, with two first touch units and two second touch units being arranged in each of the plurality of sub-areas; and each first touch unit includes four first touch electrodes, and each second touch unit includes four second touch electrodes.

19. A touch display device, comprising:

the array substrate according to claim 1;

a touch chip, wherein the touch chip is coupled to the plurality of first touch signal lines and the plurality of second touch signal lines of the array substrate; the touch chip is configured to supply a first touch signal required for a touch position detection to each of the plurality of first touch signal lines, and to supply a second touch signal required for a touch position detection to each of the plurality of second touch signal lines.

20. A method of driving an array substrate, applied to the array substrate according to claim 1; the method including a plurality of driving cycles, each of which includes a display phase and a touch phase, wherein
- in the display phase, a common voltage signal is transmitted to each common electrode of the array substrate;
- in the touch phase,
  - a first touch signal is sequentially transmitted to each row of first touch electrodes of the array substrate row by row;
  - a second touch signal is obtained from each second touch electrode or each column of second touch electrodes of the array substrate;
- or in the touch phase,
- the second touch signal is sequentially transmitted to each second touch electrode of the array substrate one by one; or the second touch signal is sequentially transmitted to each column of second touch electrodes of the array substrate column by column; and the first touch signal is obtained from each row of first touch electrodes of the array substrate.

\* \* \* \* \*